US012411450B2

(12) United States Patent
Nada et al.

(10) Patent No.: US 12,411,450 B2
(45) Date of Patent: Sep. 9, 2025

(54) IMAGE FORMING APPARATUS

(71) Applicant: CANON KABUSHIKI KAISHA, Tokyo (JP)

(72) Inventors: Takao Nada, Shizuoka (JP); Naoyuki Maeda, Shizuoka (JP); Hiroshi Kawaguchi, Shizuoka (JP); Shuntaro Tezuka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/648,825

(22) Filed: Apr. 29, 2024

(65) Prior Publication Data

US 2024/0369962 A1 Nov. 7, 2024

(30) Foreign Application Priority Data

May 1, 2023 (JP) ................................ 2023-075874

(51) Int. Cl.
*G03G 21/16* (2006.01)
*G03G 15/00* (2006.01)

(52) U.S. Cl.
CPC ..... *G03G 21/1619* (2013.01); *G03G 15/6552* (2013.01); *G03G 21/1647* (2013.01)

(58) Field of Classification Search
CPC ........... G03G 21/1619; G03G 15/6552; G03G 21/1647
See application file for complete search history.

(56) References Cited

U.S. PATENT DOCUMENTS

| | | | | |
|---|---|---|---|---|
| 8,502,999 B2 | 8/2013 | Kurokawa | | |
| 10,585,385 B2 | 3/2020 | Taniguchi | | |
| 2011/0157795 A1* | 6/2011 | Kim | G03G 21/1619 361/679.01 | |
| 2020/0314272 A1* | 10/2020 | Oyama | H04N 1/00604 | |
| 2022/0100143 A1* | 3/2022 | Ogawa | G03G 21/1619 | |

FOREIGN PATENT DOCUMENTS

| | | |
|---|---|---|
| JP | 2008090001 A | 4/2008 |
| JP | 2012093428 A | 5/2012 |
| JP | 2017102161 A | 6/2017 |
| JP | 2019101077 A | 6/2019 |

* cited by examiner

*Primary Examiner* — Sandra Brase
(74) *Attorney, Agent, or Firm* — ROSSI, KIMMS & McDOWELL LLP

(57) ABSTRACT

An image forming apparatus includes a casing including a discharge port, an upper unit arranged above the casing, a first supporting member supporting the upper unit, and a second supporting member supporting the upper unit. The casing includes a first side plate, a second side plate, and a frame member arranged downstream of the discharge port in the sheet discharge direction. In the sheet width direction, the first side plate and the first supporting member are arranged on a first side, and the second side plate and the second supporting member are arranged on a second side opposite to the first side. The frame member includes a first surface connected to the first side plate, a second surface connected to the second side plate, a third surface connected to the first supporting member, and a fourth surface connected to the second supporting member.

14 Claims, 17 Drawing Sheets

IMAGE FORMING APPARATUS

BACKGROUND OF THE INVENTION

Field of the Invention

This disclosure relates to an image forming apparatus that forms an image on a recording material.

Description of the Related Art

In Japanese Patent Application Laid-Open No. 2019-101077, it is described that, by securing a conveyance guide with respect to both a casing of the image forming apparatus and an optional apparatus secured to the top of the casing, the rigidity of an image forming apparatus is enhanced.

In the abovementioned literature, the conveyance guide is disposed upstream of a discharge port in a sheet discharge direction in which the sheet is discharged from the discharge port of the casing.

SUMMARY OF THE INVENTION

The present invention provides an image forming apparatus that can increase rigidity in its part downstream of a discharge port in a sheet discharge direction.

According to an aspect of the invention, an image forming apparatus includes a casing configured to accommodate an image forming portion that is configured to form an image on a sheet, the casing including a discharge port through which the sheet on which the image has been formed by the image forming portion is discharged in a sheet discharge direction, an upper unit arranged above the casing, a first supporting member supporting the upper unit, and a second supporting member supporting the upper unit, wherein the casing includes a first side plate extending in a direction intersecting with a sheet width direction perpendicular to the sheet discharge direction, a second side plate extending in a direction intersecting with the sheet width direction, and a frame member arranged downstream of the discharge port in the sheet discharge direction and configured to connect the first side plate and the second side plate, wherein, in the sheet width direction, the first side plate and the first supporting member are arranged on a first side with respect to a center of the casing, and the second side plate and the second supporting member are arranged on a second side opposite to the first side with respect to the center of the casing, and wherein the frame member includes a first surface connected to the first side plate, a second surface connected to the second side plate, a third surface connected to the first supporting member, and a fourth surface connected to the second supporting member.

Further features of the present invention will become apparent from the following description of exemplary embodiments with reference to the attached drawings.

DESCRIPTION OF THE EMBODIMENTS

Hereinafter, with reference to drawings, embodiments of the present disclosure will be described.

In the following description and drawings, unless specifically stated otherwise, the term “down” or “below” refers to the direction of gravity when an image forming apparatus is installed on a horizontal plane, and “up” or “above” refers to the direction opposite to the direction of gravity. In a sheet discharge direction D1 in which a sheet is discharged from a discharge port 100*d* (refer to FIG. 1) toward a sheet discharge tray 135 of a printer body 100, a downstream side is referred to as “front” or “front side”, and an upstream side is referred to as “back” or “back side”. The right side when viewing the image forming apparatus 1 from the front side is referred to as “right” or “right side”, and the left side when viewing the image forming apparatus 1 from the front side is referred to as “left” or “left side”. The terms “right side” and “left side” are collectively referred to as a left-right direction. The left-right direction in the present embodiment is a sheet width direction perpendicular to the sheet discharge direction D1.

Further, in the following description and drawings, unless specifically stated otherwise, the term “connection” refers to the act of joining two members, regardless of a method used, such as fastening utilizing fasteners, welding of metal pieces, or adhesion utilizing adhesive substances. The term “fastening” refers to the use of fasteners such as a screw and a bolt to connect two separate members. To be noted, while, in the following description, it is described as two members to be fastened to each other, basically, other forms of connection techniques instead of the fastening can be used.

First Embodiment

Figure 1:
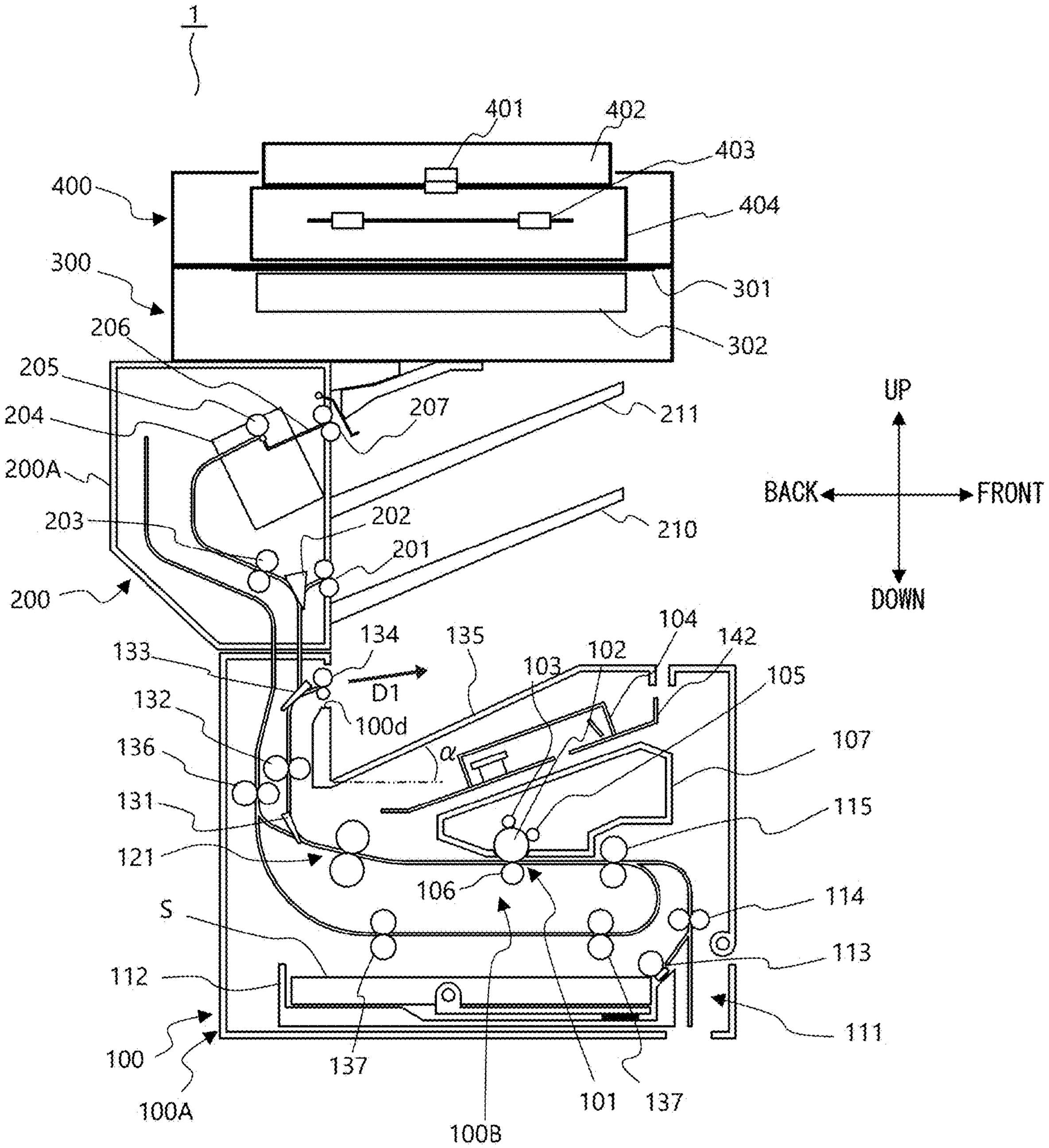
FIG. 1 is a schematic diagram illustrating an image forming apparatus of a first embodiment.

FIG. 1 is a schematic diagram illustrating a configuration of an image forming apparatus 1 of a first embodiment. A sheet processing apparatus 200 that processes a sheet S output from a printer body 100 is mounted on the top of the printer body 100. Further, a document reading apparatus 300 that reads a document, and a document conveyance apparatus 400 that automatically conveys the document to a reading unit of the document reading apparatus 300 are mounted on the top of the sheet processing apparatus 200.

That is, the image forming apparatus 1 of the present embodiment is a multi-function machine including the printer body 100, the sheet processing apparatus 200, the document reading apparatus 300, and the document conveyance apparatus 400. That is, in addition to a function of forming an image on the sheet S in the printer body 100, the image forming apparatus 1 possesses functions such as processing the sheet S with a formed image and reading the image from the document.

To be noted, in the present embodiment, an image forming apparatus that includes the printer body 100 and at least one of the sheet processing apparatus 200, the document reading apparatus 300, and the document conveyance apparatus 400 is referred to as the "multi-function machine" or a "multi-function printer". Further, an image forming apparatus that does not include any of the sheet processing apparatus 200, the document reading apparatus 300, and the document conveyance apparatus 400 is referred to as a "single-function printer".

As for the sheet S, serving as a recoding material (recording medium), it is possible to use various sheet materials which are different in size and materials, including paper such as standard paper and cardboard, a surface treated sheet material such as coated paper, a specially shaped sheet material such as an envelope and index paper, a plastic film, cloth, and the like.

The printer body 100 (image forming apparatus body) includes an image forming portion 100B and a casing 100A accommodating the image forming portion 100B. The sheet processing apparatus 200 is an example of an upper unit arranged above the casing 100A.

The casing 100A includes a body frame 100F, described below. Further, the casing 100A includes members (for example, a cover member forming an exterior surface of the printer body 100, and a guide member forming a conveyance path of the sheet S in an interior of the printer body 100) secured with respect to the body frame 100F. Further, constituent elements, described below, of the printer body 100 may be built into the casing 100A as a part of the casing, or may be made detachable with respect to the casing 100A.

Further, the discharge port **100*d* and the sheet discharge tray 135 are disposed in the casing 100A. The discharge port 100*d* is an opening through which the sheet S, on which the image has been formed in the image forming portion 100B, passes at the time when the sheet is discharged to the outside of the casing 100A. A movement direction of the sheet S which is discharged from the discharge port 100*d* is referred to as the sheet discharge direction D1. The discharge port 100*d* is opened toward the front side of the image forming apparatus 1**.

The sheet discharge tray 135 is a supporting portion by which the sheet S that has been discharged from the discharge port **100*d* is supported. The sheet discharge tray 135 is disposed on an upper surface portion of the casing 100A. The sheet discharge tray 135 of the present embodiment is a surface which is disposed on the upper surface portion of the casing 100A and is inclined upward toward the front side. In other words, the sheet discharge tray 135 is a surface that is inclined upward toward a downstream side in the sheet discharge direction D1**.

The image forming portion 100B includes a photosensitive drum 102, serving as an image bearing member, a charge roller 103, serving as a charge unit, a laser scanner 104, serving as an exposing unit, a developing roller 105, serving as a developing unit, and a transfer roller 106, serving as a transfer member. Further, the image forming portion 100B includes a fixing unit 121, serving as a fixing unit.

The photosensitive drum 102 is a drum type electrophotographic photosensitive member. The photosensitive drum 102 is a member in which a photosensitive material such as an organic photo conductor (OPC), amorphous selenium, or amorphous silicon is formed on a circumferential surface of a cylindrical drum substrate made of such as aluminum and nickel. The photosensitive drum 102 is rotatably driven by a drive source arranged in the casing 100A. The charge roller 103, the developing roller 105, and the transfer roller 106 are arranged around the photosensitive drum 102. Further, the laser scanner 104 is arranged above the photosensitive drum 102.

A transfer nip 101, serving as a transfer portion at which a toner image is transferred onto the sheet S, is formed between the transfer roller 106 and the photosensitive drum 102. The transfer roller 106 is urged toward the photosensitive drum 102 by an urging member.

The fixing unit 121 includes a fixing roller (heating roller), a pressing roller facing the fixing roller, and a heating unit such as a halogen lamp heating the fixing roller. The fixing unit 121 may be a film heating type in which a ceramic heater is arranged within an interior of a tubular shaped film.

At least part of the image forming portion 100B may be disposed in a cartridge that is detachable with respect to the casing 100A. In the present embodiment, the photosensitive drum 102, the charge roller 103, and the developing roller 105 are disposed in a process cartridge 107 that is integrally detachable with respect to the casing 100A.

In the printer body 100, a sheet feeding unit 111, a conveyance roller pair 114, a registration roller pair 115, a post-fixing roller pair 132, a sheet discharge roller pair 134, the sheet discharge tray 135, a reverse conveyance roller pair 136, and a re-conveyance roller pair 137 are disposed. The sheet feeding unit 111 includes a cassette 112 in which the sheet S is stacked and stored, and a sheet feed unit 113 that feeds the sheet S from the cassette 112 one sheet at a time. Each of the sheet feeding unit 111, the conveyance roller pair 114, the registration roller pair 115, the post-fixing roller pair 132, the sheet discharge roller pair 134, the reverse conveyance roller pair 136, and the re-conveyance roller pair 137 can be said to include a roller that conveys the sheet S. In the present embodiment, directions of rotation shafts of these rollers are aligned in parallel.

The sheet discharge roller pair 134 is an example of a sheet discharge unit that discharges the sheet S, on which the image has been formed, to the outside of the casing 100A of the printer body 100. The sheet width direction is a direction parallel to rotational axes of rollers of the sheet discharge roller pair 134. The sheet discharge roller pair 134 discharges the sheet S toward the front side of the image forming apparatus 1 via the discharge port **100*d* of the casing 100A. The reverse conveyance roller pair 136** is an example of a reverse conveyance unit that reverses the sheet S at the time of duplex printing.

The sheet processing apparatus 200 is an apparatus that performs processing on the sheet by receiving the sheet, on which the image has been formed by the image forming portion 100B of the printer body 100, from the casing 100A of the printer body 100. The sheet processing apparatus 200 is also called as a finisher.

The sheet processing apparatus 200 includes a first sheet discharge roller pair 201, a fixed sheet discharge tray 210, an inlet roller pair 203, a processing unit 204, a second sheet discharge roller pair 207, and a mobile sheet discharge tray 211. Further, a branched conveyance path is disposed within a casing 200A of the sheet processing apparatus 200. The first sheet discharge roller pair 201 and the fixed sheet discharge tray 210 are arranged in a first conveyance path. The inlet roller pair 203, the processing unit 204, the second sheet discharge roller pair 211, and the mobile sheet discharge tray 211 are arranged in a second conveyance path branched from the first conveyance path. The fixed sheet discharge tray 210 is secured with respect to the casing 200A. The mobile sheet discharge tray is movable (liftable) with respect to the casing 200A.

The processing unit 204 includes a processing stage 206 supporting the sheet S and a sheet discharge roller 205 discharging the sheet S to the processing stage 206. Further, the processing unit 204 includes a processing mechanism that is capable of performing at least one processing on the sheet S, including binding processing to bind a plurality of sheets of the sheet S or punching processing to create a hole in the sheet S.

The document reading apparatus 300 is an image reading apparatus that reads image information from the document. The image forming apparatus 1 that includes the document reading apparatus 300 can form the image on the sheet based on the image information read by the document reading apparatus 300.

The document reading apparatus 300 includes a glass surface 301 on which the document is placed, and a reading unit 302 reading the image of the document. The document conveyance apparatus 400 includes a document tray 402 on which the document is stacked, a document feeding portion 401 feeding the document from the document tray 402, a conveyance roller pair 403 conveying the fed document toward the reading unit 302, and a conveyance guide 404 guiding the document.

Operation of Image Forming Apparatus

Next, an operation of the image forming apparatus 1 will be described. When an execution instruction (printing instruction) of an image forming operation is input to the image forming apparatus 1, the image forming apparatus 1 starts an image forming operation. First, the photosensitive drum 102 is rotatably driven at a predetermined circumferential speed (process speed). The charge roller 103 uniformly charges a surface of the photosensitive drum 102 to a predetermined polarity and a predetermined potential. The laser scanner 104 exposes the photosensitive drum 102 by irradiating the surface of the photosensitive drum 102 with a laser light based on the image information input from an external computer along with the printing instruction, or the image information that the document reading apparatus 300 has read from the document. Thereby, a charge in exposed areas on the surface of the photosensitive drum 102 is removed, and an electrostatic latent image corresponding to the image information is formed. The developing roller 105 supplies toner, serving as developer, to the photosensitive drum 102, and develops the electrostatic latent image to a toner image. The toner image formed on the photosensitive drum 102 is conveyed toward the transfer nip 101 by the rotation of the photosensitive drum 102.

On the other hand, the sheet S is conveyed from the cassette 112 by the sheet feed unit 113 one sheet at a time. After passing through the conveyance roller pair 114 and receiving skew correction and a timing adjustment at the registration roller pair 115, the fed sheet S is conveyed to the transfer nip 101. Then, the toner image is transferred from the photosensitive drum 102 onto the sheet S at the transfer nip 101.

The sheet S passed through the transfer nip 101 is sent to the fixing unit 121. While nipping and conveying the sheet S at a fixing nip between the fixing roller and the pressing roller, the fixing unit 121 fixes the toner image on the sheet S by applying heat and pressure to the toner image on the sheet S.

The sheet S passed through the fixing unit 121 is guided by a first switching member 131 to a conveyance path that has been determined in the printing instruction in advance. In a case of performing simplex printing in which the image is formed on one side of the sheet S, the sheet S is guided by the first switching member 131 to the post-fixing roller pair 132. In a case of performing duplex printing in which the image is formed on both surfaces of the sheet S, the sheet S on whose first surface the image has been formed is guided by the first switching member 131 to the reverse conveyance roller pair 136. After having been reversed and conveyed (switchbacked) by the reverse conveyance roller pair 136, the sheet S is again conveyed to the transfer nip 101 via the re-conveyance roller pair 137. Then, the sheet S, on whose second surface opposite to the first surface the image has been formed by passing through the transfer nip 101 and the fixing nip, is guided by the first switching member 131 to the post-fixing roller pair 132.

In the present embodiment, the sheet S, which has completed either the simplex printing or the duplex printing, is conveyed via the post-fixing roller pair 132. In a case where the sheet S is not sent to the sheet processing apparatus 200, the sheet S that has passed through the post-fixing roller pair 132 is guided by a second switching member 133 to the sheet discharge roller pair 134. In this case, the sheet S is discharged to the outside of the casing 100A by the sheet discharge roller pair 134 by passing through the discharge port 100*d*, and is supported by the sheet discharge tray 135. In a case where the sheet S is sent to the sheet processing apparatus 200, the sheet S that has passed through the post-fixing roller pair 132 is guided by the second switching member 133 to a conveyance path heading to the sheet processing apparatus 200. In this case, the sheet S is discharged to the outside of the casing 100A through a discharge port communicating with the sheet processing apparatus 200, and is received by the sheet processing apparatus 200.

The sheet S that the sheet processing apparatus 200 has received from the printer body 100 is guided by a switching member 202 to a conveyance path that has been determined in the printing instruction in advance. In a case where the processing is not performed on the sheet S, the sheet S is guided by the switching member 202 to the sheet discharge roller pair 201, and is discharged to the fixed sheet discharge tray 210 by the sheet discharge roller pair 201. In a case where the processing is to be performed on the sheet S, the sheet S is guided by the switching member 202 to the inlet roller pair 203, and is conveyed toward the processing unit 204 by the inlet roller pair 203. The processing unit 204 discharges the sheet S to the processing stage 206 by the sheet discharge roller 205, and performs the processing such as the binding processing or the punching processing on the sheet S. The processed sheet S is discharged to the mobile sheet discharge tray 211 by the sheet discharge roller pair 207.

Operations of Document Reading Apparatus and Document Conveyance Apparatus

Next, operations of the document reading apparatus 300 and the document conveyance apparatus 400 will be described. The document reading apparatus 300 and the document conveyance apparatus 400 can perform a feeding reading operation to read the image of the document while conveying the document by the document conveyance apparatus 400. In the feeding reading operation, the document stacked on the document tray 402 is fed by a document conveyance unit 401 one sheet at a time, and is guided by a conveyance guide 404, so that the document is conveyed to the glass surface 301 of the document reading apparatus 300 via the conveyance roller pair 403. The reading unit 302 of the document reading apparatus 300 optically scans the document through the glass surface 301, and obtains the image information in which the image of the document is converted into electronic data. The document that has been read by the reading unit 302 is discharged to a document discharge tray disposed in the document conveyance apparatus 400.

Frame of Printer Body

Figure 2:
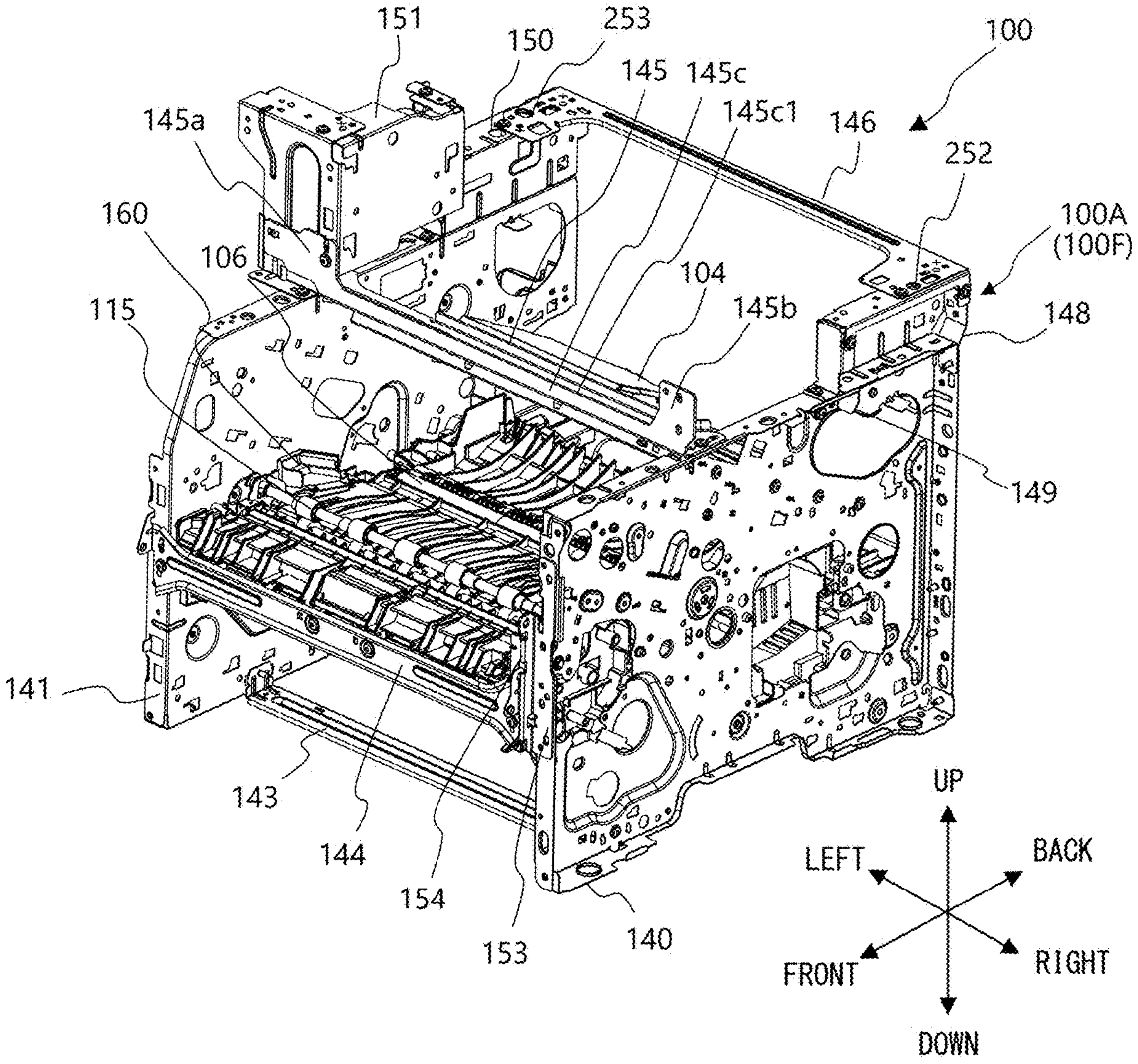
FIG. 2 is a perspective view illustrating part of a frame of the image forming apparatus of the first embodiment.
Figure 3:
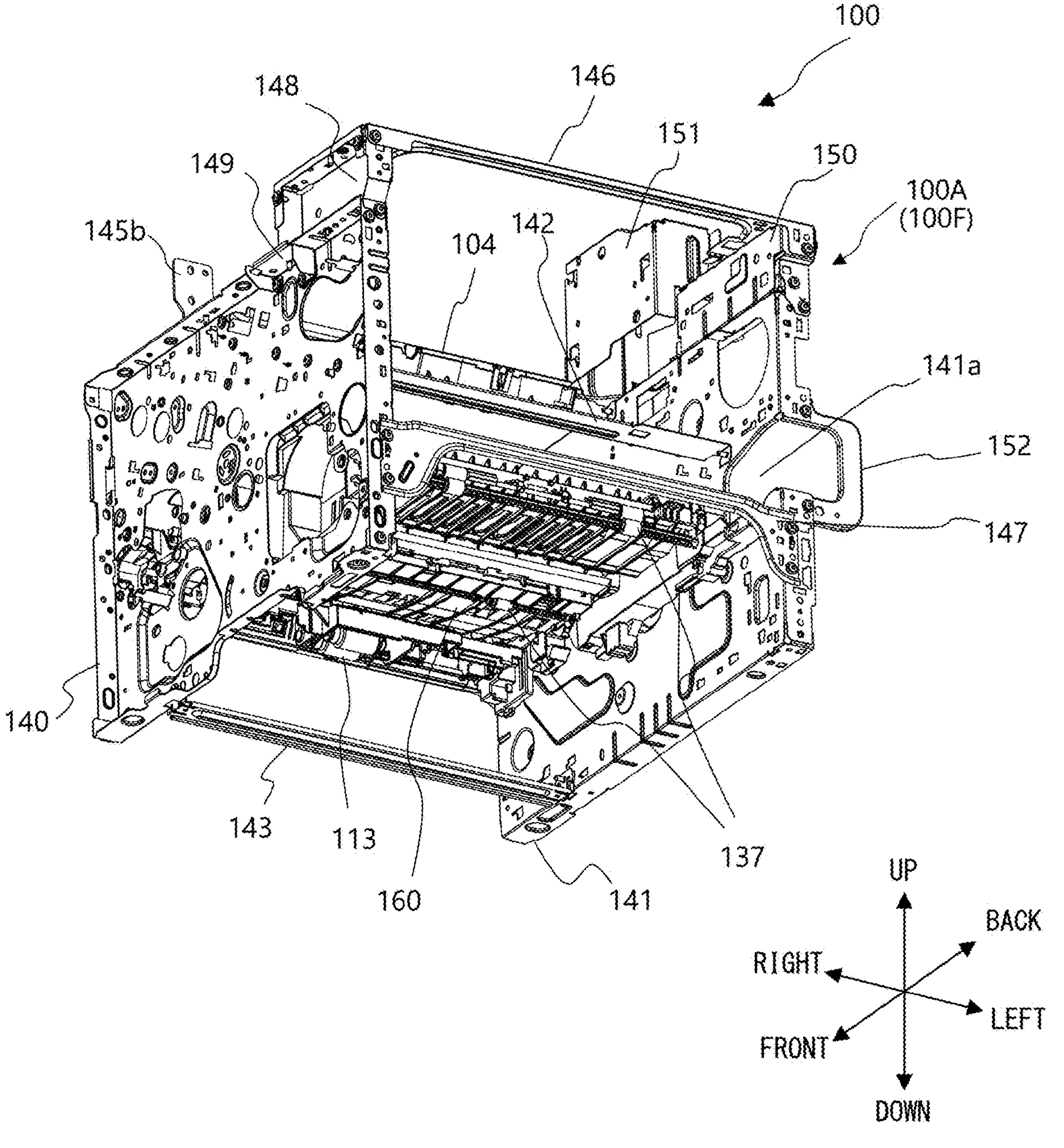
FIG. 3 is a perspective view illustrating part of the frame of the image forming apparatus of the first embodiment.
Figure 14:
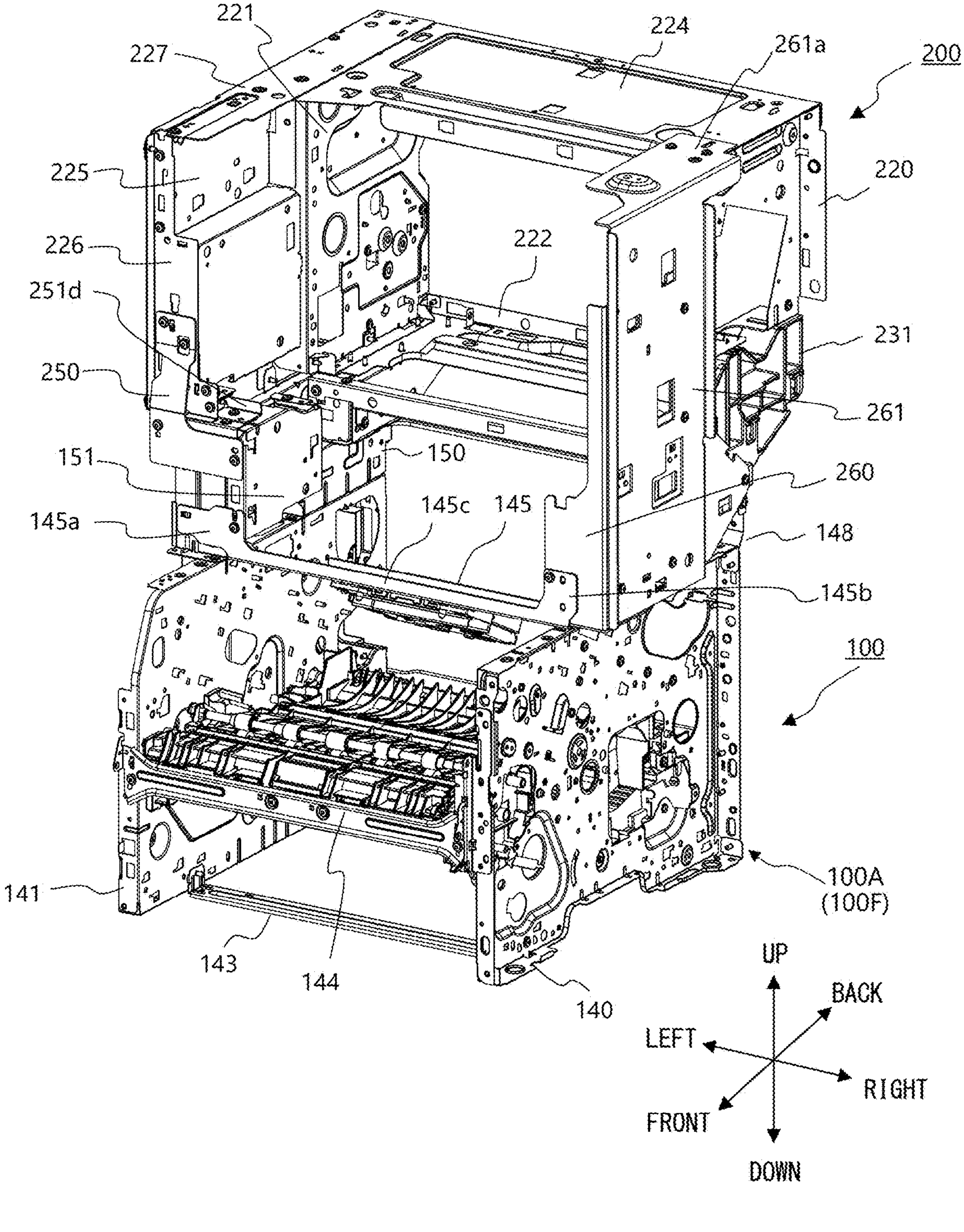
FIG. 14 is a perspective view illustrating the frame of the image forming apparatus of the first embodiment.
Figure 15:
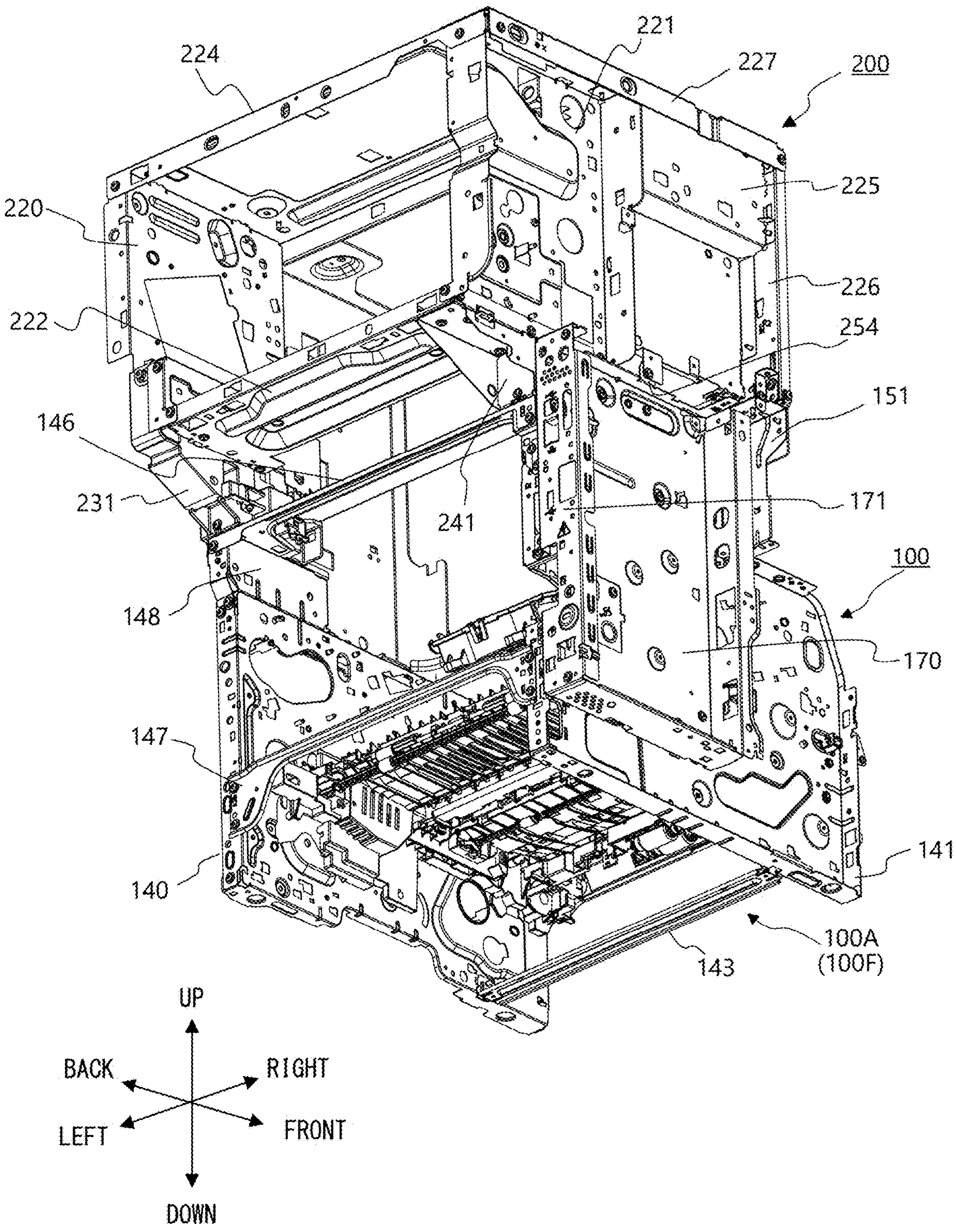
FIG. 15 is a perspective view illustrating the frame of the image forming apparatus of the first embodiment.

The body frame 100F of the printer body 100 will be described. First, using FIGS. 2 and 3, an overview of the body frame 100F will be described. FIGS. 2 and 3 are perspective views illustrating part of frames of the image forming apparatus 1 of the first embodiment. To be noted, FIGS. 2 and 3 illustrate the body frame 100F and an apparatus supporting member left 151 among the frames of the image forming apparatus 1, which are illustrated in FIGS. 14 and 15. As described below, the frames of the image forming apparatus 1 include the body frame 100F, a frame 200F of the sheet processing apparatus 200, the apparatus supporting member left 151, an apparatus supporting member right inner 260, an apparatus supporting member right outer 261, and the like.

As illustrated in FIGS. 2 and 3, the body frame 100F includes a right side plate 140, a left side plate 141, a scanner stay 142, a bottom stay 143, a front stay 144, a front upper stay 145, a back upper stay 146, and a back lower stay 147. Further, the body frame 100F includes an extension member right 148 connected to the right side plate 140, and an extension member left 150 connected to the left side plate 141. The right side plate 140 is an example of a first side plate. The left side plate 141 is an example of a second side plate. The front upper stay 145 is an example of a frame member. With respect to the rotational axis direction of the photosensitive drum 102, the right side plate 140 is arranged on one end side of the process cartridge 107, and the left side plate 141 is arranged on the other end side of the process cartridge 107. The process cartridge 107 is attached and detached with respect to the casing 100A in a direction intersecting with (preferably, perpendicularly intersecting with) the rotational axis direction of the photosensitive drum 102. A guide member guiding the attachment of the process cartridge 107 with respect to the casing 100A and a positioning portion positioning the process cartridge 107 at an image forming position are disposed in each of the right and left side plates 140 and 141.

The right side plate 140 is disposed on the right side of the body frame 100F, and is a plate-shaped frame member spreading in the front-back direction and the up-down direction. That is, the right side plate 140 is arranged on a first side with respect to a center of the casing 100A in the sheet width direction, and extends in a direction intersecting with the sheet width direction described above. The left side plate 141 is arranged on the left side of the body frame 100F, and is a plate-shaped frame member spreading in the front-back direction and the up-down direction. That is, the left side plate 141 is arranged on a second side opposite to the first side with respect to the center of the casing 100A in the sheet width direction, and extends in a direction intersecting with the sheet width direction described above. In other words, the right side plate 140 is arranged on the one end side with respect to the center of the casing 100A, and the left side plate 141 is arranged on the other end side opposite to the one end side with respect to the center of the casing 100A. Further, it is also possible to say that the right side plate 140 is arranged on the first side with respect to the center of the casing 100A in the sheet width direction, and the left side plate 141 is arranged on the second side opposite to the first side with respect to the center of the casing 100A in the sheet width direction. In other words, the right side plate 140 is arranged on the one end side with respect to the center of the apparatus body frame 100F, and the left side plate 141 is arranged on the other end side opposite to the one end side with respect to the center of the apparatus body frame 100F.

The sheet feed unit 113, the laser scanner 104, and a core unit 160 of the printer body 100 are arranged between the right and left side plates 140 and 141 in the left-right direction, and are each mounted to the apparatus body frame 100F. The sheet feed unit 113 and the core unit 160 are fastened to the right and left side plates 140 and 141 with, for example, screws that penetrate the right and left side plates 140 and 141 from exterior to interior. That is, the right and left side plates 140 and 141 support the sheet feed unit 113 and the core unit 160. The laser scanner 104 is placed on the scanner stay 142, and is fastened to the scanner stay 142. To be noted, the core unit 160 is a unit including the conveyance roller pair 114, the registration roller pair 115, the transfer roller 106, and the re-conveyance roller pair 137 (refer to FIG. 1). The core unit 160 forms conveyance paths through which the sheet S passes. In the present embodiment, the core unit 160 forms the conveyance paths for the sheet S during the execution of the simplex and duplex printing. Further, the core unit 160 includes a plurality of guide ribs that guide the sheet S passing through these conveyance paths.

The scanner stay 142, the bottom stay 143, the front stay 144, the front upper stay 145, and the back lower stay 147 each are the frame member that connects the right and left side plates 140 and 141. Details of the front upper stay 145, and the back upper stay 146 will be described below.

The scanner stay 142 is arranged above a mounting space into which the process cartridge 107 is mounted (also refer to FIG. 1). The bottom stay 143 connects bottom portions of the right and left side plates 140 and 141 at positions further front than a central position of the casing 100A in the front-back direction. The front stay 144 connects front portions of the right and left side plates 140 and 141. The front upper stay 145 connects upper portions of the right and left side plates 140 and 141 at positions further front than the central position of the casing 100A in the front-back direction. The back lower stay 147 connects back portions of the right and left side plates 140 and 141 at positions lower than a central position of the casing 100A in the up-down direction.

In the present embodiment, the scanner stay 142 and the bottom stay 143 are fastened to the right and left side plates 140 and 141 with screws that penetrate the right and left side plates 140 and 141 from exterior to interior. The front stay 144 is directly connected to a front surface of the left side plate 141, and, concurrently, by being fastened to a front stay mounting plate 153 (refer to FIG. 2) fastened to the right side plate 140, is fastened to the right side plate 140 via the front stay mounting plate 153. The back lower stay 147 is fastened to back surfaces of the right and left side plates 140 and 141.

Each stay (142 to 147) is a substantially planar-shaped metal member (metal plate) extending in the right-left direction. Each stay (142 to 147) may be subjected to drawing, hemming, or bending processing. The right and left side plates 140 and 141 are also substantially planar-shaped metal members (metal plates). The right and left side plates 140 and 141 may be subjected to the drawing, hemming, or bending processing.

Further, as illustrated in FIG. 3, an installation hole 141*a* for installing the fixing unit 121 is disposed in a back portion of the left side plate 141. By disposing the installation hole 141*a*, when viewed from the back, a space between the right and left side plates 140 and 141 is expanded. Therefore, when assembling the printer body 100, it becomes possible to mount the fixing unit 121 with respect to the body frame 100F by inserting the fixing unit 121 from the back side of the body frame 100F. A reinforcing plate 152 connecting upper and lower edges of the installation hole 141*a* in the back surface of the left side plate 141 is disposed on the left side plate 141, and is fastened to the left side plate 141. The left side plate 141 is reinforced by the reinforcing plate 152, and a reduction in the strength of the body frame 100F caused by the disposition of the installation hole 141*a* is mitigated.

Extension Member

Here, the extension member right 148 and the extension member left 150 will be described. By the inclusion or exclusion of the extension members, while sharing part of constituent elements with the image forming apparatus 1, the image forming apparatus 1 of the present embodiment can be converted into other product forms that are different in function and performance.

Figure 4:
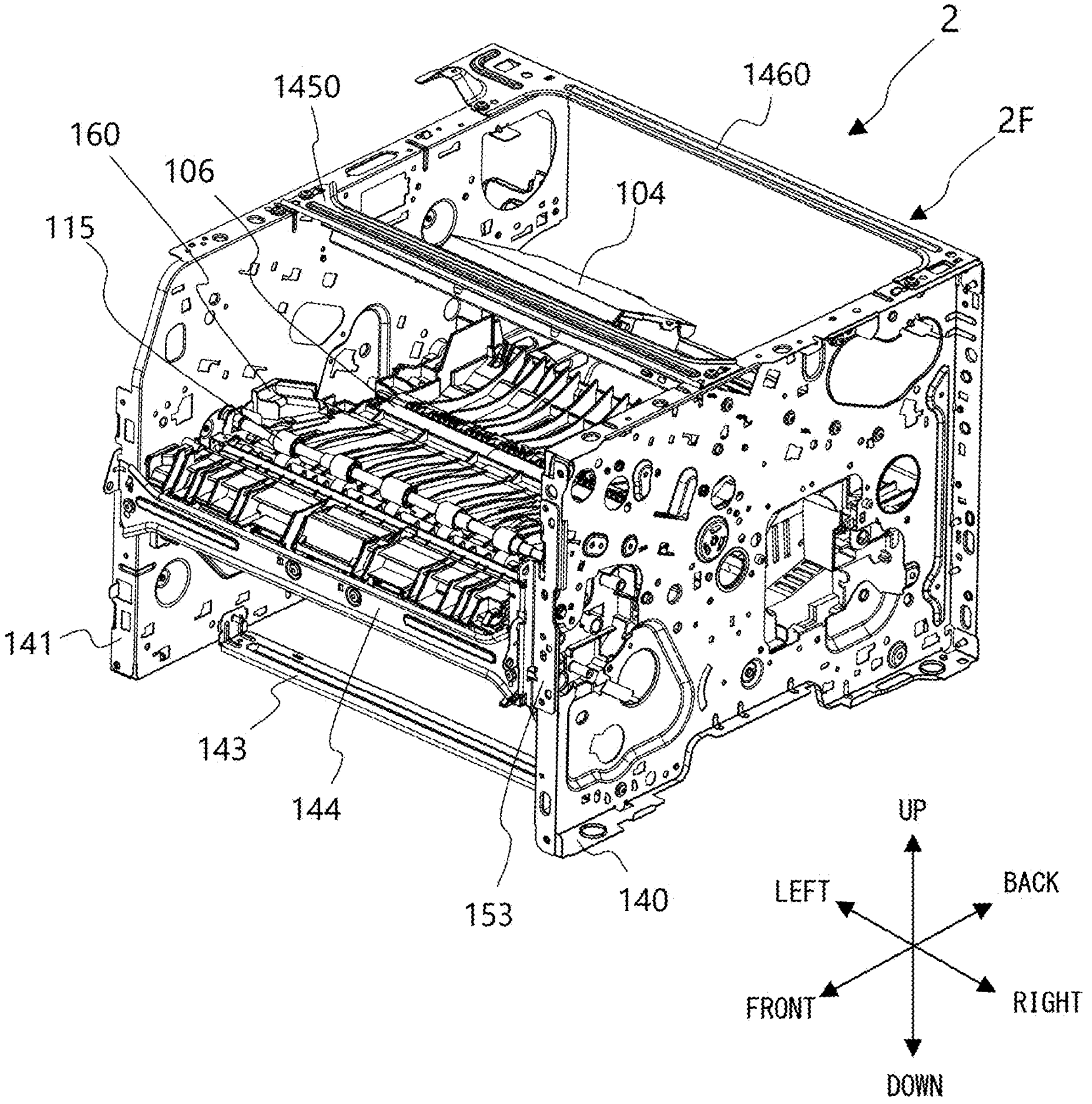
FIG. 4 is a perspective view illustrating a frame of an image forming apparatus of a variant example.
Figure 5:
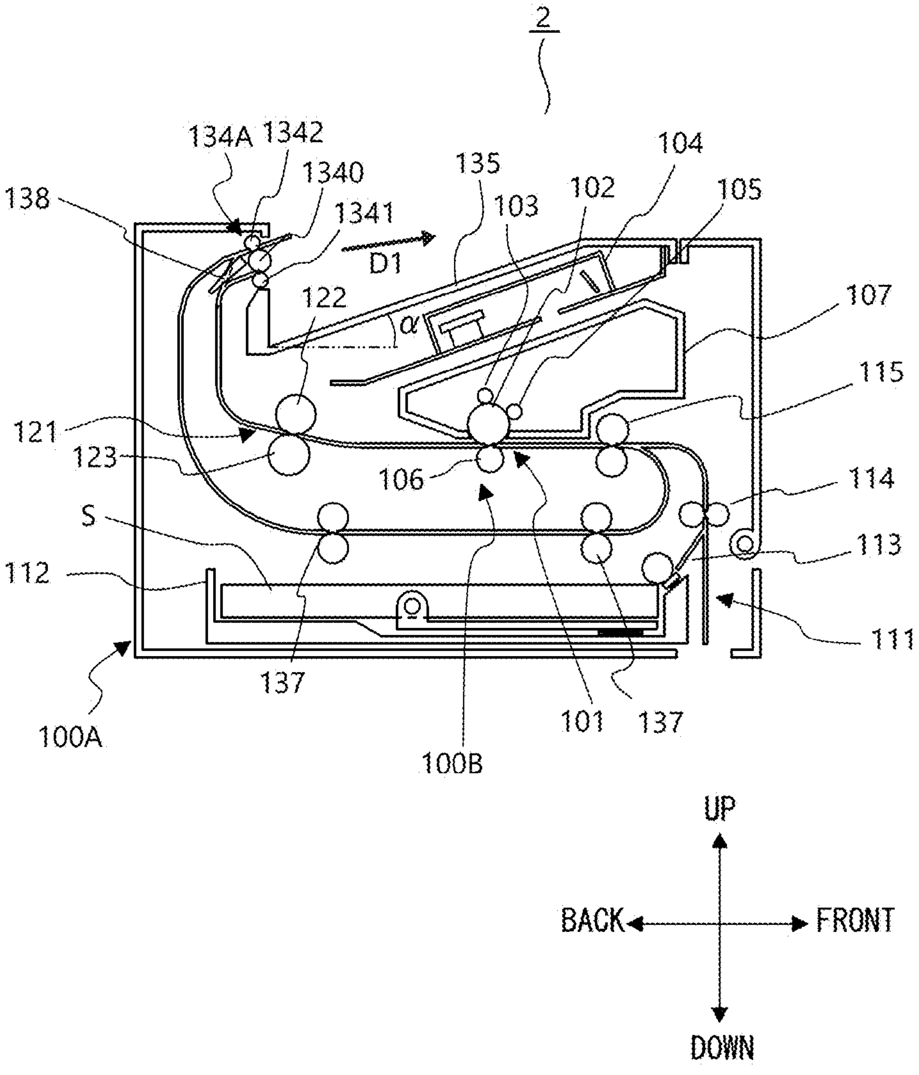
FIG. 5 is a schematic diagram illustrating the image forming apparatus of the variant example.

FIGS. 4 and 5 illustrate an image forming apparatus 2 as an example (variant example of the first embodiment) of the other product forms. The image forming apparatus 2 is a single function printer. FIG. 4 is a perspective view illustrating a frame 2F of the image forming apparatus 2. FIG. 5 is a schematic view illustrating the image forming apparatus 2. Hereinafter, while comparing with the image forming apparatus 2 of the variant example, which does not include the extension member right 148 and the extension member left 150, the extension member right 148 and the extension member left 150 in the image forming apparatus 1 of the present embodiment will be described.

The image forming apparatus 2 of the variant example is different from the image forming apparatus 1 (refer to FIG. 1) of the first embodiment in aspects such as a sheet conveyance path during the duplex printing and the number of sheets that can be supported by the sheet discharge tray 135. Hereinafter, in the image forming apparatus 2, members that are put with reference characters common to the image forming apparatus 1 of the first embodiment possess substantially the same configuration and function as corresponding members in the image forming apparatus 1 of the first embodiment.

As illustrated in FIG. 4, the frame 2F of the image forming apparatus 2 of the variant example does not include the extension member right 148 and the extension member left 150 (refer to FIG. 2). Further, the frame 2F includes a back upper stay 1460 instead of the back upper stay 146 of the first embodiment, and includes a front upper stay 1450 instead of the front upper stay 145 of the first embodiment.

In the image forming apparatus 2 of the variant example, the back upper stay 1460 is fastened to an upper surface and the back surface of the right side plate 140 and an upper surface and the back surface of the left side plate 141.

In contrast, in the image forming apparatus 1 of the first embodiment, as illustrated in FIGS. 2 and 3, the extension member right 148 is mounted to a back portion of the upper surface of the right side plate 140, and the extension member left 150 is mounted to a back portion of the upper surface of the left side plate 141. The extension member right 148 is an example of a first extension member that is connected to the first side plate by being arranged above the first side plate. The extension member left 150 is an example of a second extension member that is connected to the second side plate by being arranged above the second side plate.

The back upper stay 146 is fastened to an upper surface and a back surface of the extension member right 148, and an upper surface and a back surface of the extension member left 150. Within the upper surface of the right side plate 140, a reinforcing plate 149 (refer to FIG. 2) is disposed at a place to which the extension member right 148 is mounted. The reinforcing plate 149 suppresses the inclination of the extension member right 148 with respect to the right side plate 140 by reinforcing the upper surface of the right side plate 140.

As illustrated in FIG. 5, the image forming apparatus 2, which does not include the extension member, does not include the sheet discharge roller pair 134 and the reverse conveyance roller pair 136 (refer to FIG. 1) of the first embodiment. The image forming apparatus 2 includes a triple roller 134A, serving as a sheet discharge unit discharging the sheet S and a reverse unit reversing the sheet S at the time of the duplex printing. The triple roller 134A includes a sheet discharge reverse roller 1340, a sheet discharge idler roller 1341 coming into contact with the sheet discharge reverse roller 1340, and a reverse idler roller 1342 coming into contact with the sheet discharge reverse roller 1340.

The sheet S passed through the fixing unit 121 is guided by a switching member 138 to a nip portion (sheet discharge nip) of the sheet discharge reverse roller 1340 and the sheet discharge idler roller 1341, or a nip portion (reverse nip) of the sheet discharge reverse roller 1340 and the reverse idler roller 1342. The sheet S that has completed either the simplex printing or the duplex printing is guided by the switching member 138 to the sheet discharge nip, and is discharged to the sheet discharge tray 135 by the sheet discharge reverse roller 1340 and the sheet discharge idler roller 1341. In a case of performing the duplex printing, the sheet S on whose first surface the image has been formed is guided by the switching member 138 to the reverse nip. After having been reversed and conveyed (switchbacked) by the sheet discharge roller 1340 and the reverse idler roller 1342, the sheet S is again guided to the transfer nip 101 via the re-conveyance roller pair 137. Then, the sheet S on whose second surface opposite to the first surface the image has been formed by passing through the transfer nip 101 and the fixing nip is guided by the switching member 138 to the sheet discharge nip.

When comparing FIGS. 2 and 4, in comparison with the frame 2F that does not include the extension members, in the body frame 100F of the first embodiment that includes the extension members, a back portion of the body frame 100F is extended upward. Therefore, in comparison with the sheet discharge reverse roller 1340 and the sheet discharge idler roller 1341 (refer to FIG. 5) of the image forming apparatus 2 that does not include the extension members, it is possible to arrange the sheet discharge roller pair 134 (refer to FIG.

1) of the image forming apparatus 1 of the first embodiment at a higher position. That is, at least part of the sheet discharge roller pair 134 is arranged above the upper surfaces of the right and left side plates 140 and 141 by utilizing a space of the casing 100A that is expanded by the extension member right 148 and the extension member left 150. Thereby, it is possible to increase the number of sheets that can be supported by the sheet discharge tray 135.

To be noted, when the position of the sheet discharge roller pair 134 is elevated, depending on the velocity of the sheet S at the time of discharge, there is a possibility that the sheet S falls by jumping over the sheet discharge tray 135. Therefore, as described below, by increasing an inclination angle α (refer to FIGS. 1 and 5), the sheet S can be more reliably landed onto the sheet discharge tray 135. The inclination angle α is an angle of an upper surface of the sheet discharge tray 135 with respect to a horizontal surface in a case where the image forming apparatus 1 or 2 is viewed in the sheet width direction (left-right direction).

Further, in comparison with a conveyance distance from the fixing unit 121 to the sheet discharge nip in the image forming apparatus 2 (refer to FIG. 5) that does not include the extension members, a conveyance distance from the fixing unit 121 to the sheet discharge roller pair 134 in the image forming apparatus 1 (refer to FIG. 1) that includes the extension members is longer. In the image forming apparatus 1 (refer to FIG. 1) of the first embodiment, in addition to the sheet discharge roller pair 134, it is possible to arrange the reverse conveyance roller pair 136 dedicated for reversing the sheet S during the duplex printing. Therefore, by drive controlling the timing and a drive speed of the reverse conveyance roller pair 136 independently from the sheet discharge roller pair 134, it is possible to improve productivity in comparison with the image forming apparatus 2 that does not include the extension members.

Front Upper Stay

Next, while comparing with the front upper stay 1450 of the image forming apparatus 2, the front upper stay 145 in the image forming apparatus 1 of the first embodiment will be described.

As illustrated in FIG. 4, in the image forming apparatus 2, the front upper stay 1450 is fastened to the upper surfaces of the right and left side plates 140 and 141. The front upper stay 1450 is arranged downstream of the sheet discharge tray 135 in the sheet discharge direction D1. Here, the term "downstream of the sheet discharge tray 135 in the sheet discharge direction D1" refers to a position where a distance to a downstream end of the sheet discharge tray 135 in the sheet discharge direction D1 is shorter than a distance to an upstream end of sheet discharge tray 135 in the sheet discharge direction D1. That is, the front upper stay 1450 is arranged at the position where the distance to the downstream end of the sheet discharge tray 135 in the sheet discharge direction D1 is shorter than the distance to the upstream end of sheet discharge tray 135 in the sheet discharge direction D1. Further, the sheet discharge tray 135 is a surface that is located on an upper surface of the printer body 100, and is inclined upward toward the front side.

The front upper stay 1450 is a substantially planar-shaped member extending in the left-right direction. The front upper stay 1450 may be subjected to the drawing and hemming processing for reinforcement.

Figure 6:
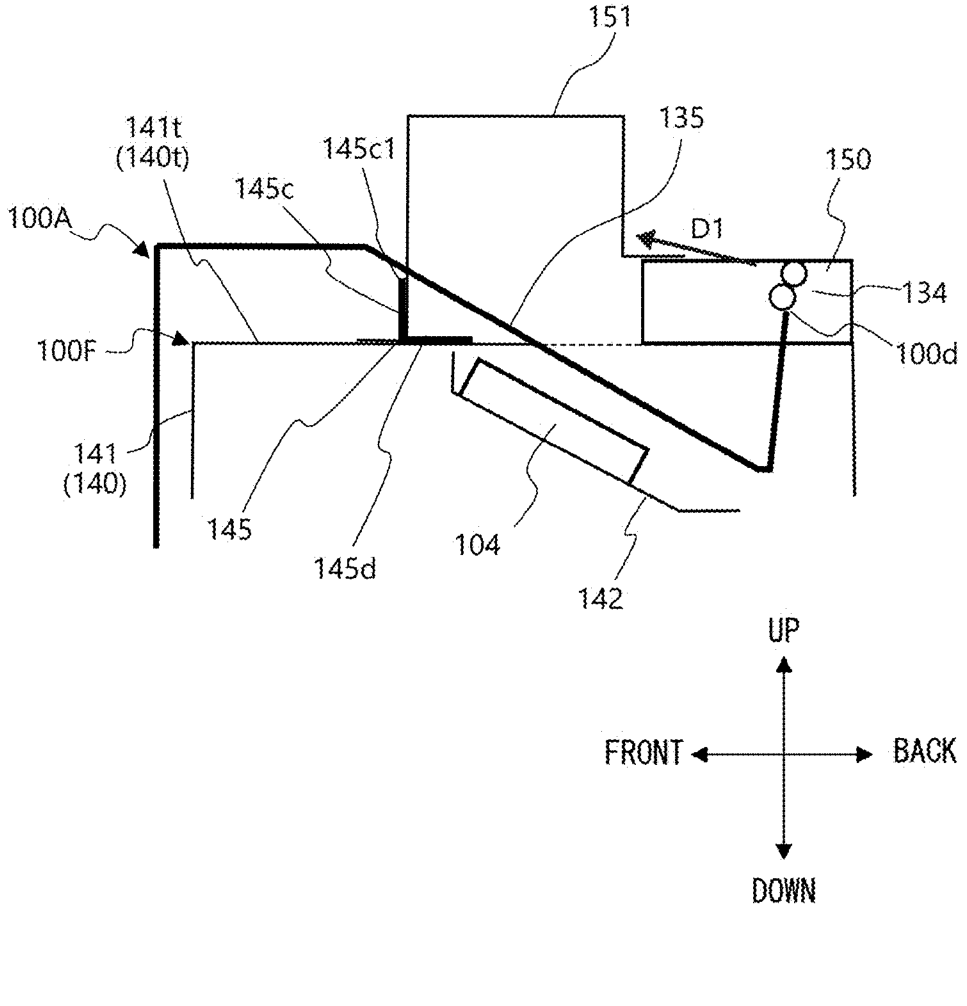
FIG. 6 is a schematic diagram illustrating a positional relationship between a sheet discharge tray and a front upper stay of the first embodiment.

As illustrated in FIG. 2, in the image forming apparatus 1 of the first embodiment, the front upper stay 145 is fastened to the upper surfaces of the right and left side plates 140 and 141. FIG. 6 is a schematic diagram illustrating a positional relationship between the sheet discharge tray 135 and the front upper stay 145, and is a cross-sectional view of the casing 100A taken along a plane perpendicular to the left-right direction.

As illustrated in FIG. 6, the front upper stay 145 is arranged downstream of the discharge port 100*d* of the casing 100A in the sheet discharge direction D1. The front upper stay 145 is arranged downstream of the sheet discharge tray 135 in the sheet discharge direction D1. That is, the front upper stay 145 is arranged at the position where the distance to the downstream end of the sheet discharge tray 135 in the sheet discharge direction D1 is shorter than the distance to the upstream end of sheet discharge tray 135 in the sheet discharge direction D1. The sheet discharge tray 135 is inclined upward toward the downstream side in the sheet discharge direction D1, and is extended to a position higher than an upper end 140*t* of the right side plate 140 and an upper end 141*t* of the left side plate 141. That is, the downstream end of the sheet discharge tray 135 is positioned above the front upper stay 145. Further, among end portions of the casing 100A, an end portion that is positioned upstream of the discharge port 100*d* in the sheet discharge direction D1 is referred to as an upstream end, and an end portion that is positioned downstream of the discharge port 100*d* in the sheet discharge direction D1 is referred to as a downstream end. In this case, as illustrated in FIG. 6, when viewed in the sheet width direction, a position of the front upper stay 145 is closer to the downstream end of the casing 100A than the upstream end of the casing 100A. That is, a distance between the front upper stay 145 and the downstream end of the casing 100A is shorter than a distance between the front upper stay 145 and the upstream end of the casing 100A.

The front upper stay 145 includes two side plate connection surfaces 145*d*, and supporting member connection surfaces 145*a* and 145*b*. The front upper stay 145 is connected to the right and left side plates 140 and 141 via each of the side plate connection surfaces 145*d*, and is connected to the apparatus supporting member right inner 260 (refer to FIG. 14), described below, and the apparatus supporting member left 151 via the supporting member connection surfaces 145*a* and 145*b*, respectively. Further, the front upper stay 145 includes an intermediate portion 145*c* that connects the side plate connection surface 145*d* on the right and the supporting member connection surface 145*b* with the side plate connection surface 145*d* on the left and the supporting member connection surface 145*a*.

The side plate connection surface 145*d* connected to the right side plate 140 is a first surface of the front upper stay 145. The side plate connection surface 145*d* connected to the left side plate 141 is a second surface of the front upper stay 145. The supporting member connection surface 145*b* connected to the apparatus supporting member right inner 260 is a third surface of the front upper stay 145. The supporting member connection surface 145*a* connected to the apparatus supporting member left 151 is a fourth surface of the front upper stay 145.

The side plate connection surface 145*d* on the right is connected to the upper surface of the right side plate 140. The side plate connection surface 145*d* on the right and the upper surface of the right side plate 140 are surfaces that spread in a direction intersecting with the vertical direction, and, in the present embodiment, are surfaces that spread in the horizontal direction. The side plate connection surface 145*d* on the left is connected to the upper surface of the left side plate 141. The side plate connection surface 145*d* on the left and the upper surface of the left side plate 141 are surfaces that spread in a direction intersecting with the vertical direction, and, in the present embodiment, are surfaces that spread in the horizontal direction. The supporting member connection surface 145*b* on the right is connected to the apparatus supporting member right inner 260 at a position above the upper surface of the right side plate 140. The supporting member connection surface 145*a* on the left is connected to the apparatus supporting member left 151 at a position above the upper surface of the left side plate 141.

The side plate connection surfaces 145*d* and the supporting member connection surfaces 145*a* and 145*b* of the front upper stay are formed by a single metal plate. The metal plate is bent between the side plate connection surface 145*d* on the right extending substantially in the front-back direction and the supporting member connection surface 145*b* on the right extending substantially in the up-down direction, and is bent between the side plate connection surface 145*d* on the left extending substantially in the front-back direction and the supporting member connection surface 145*a* on the left extending substantially in the up-down direction.

Figure 16:
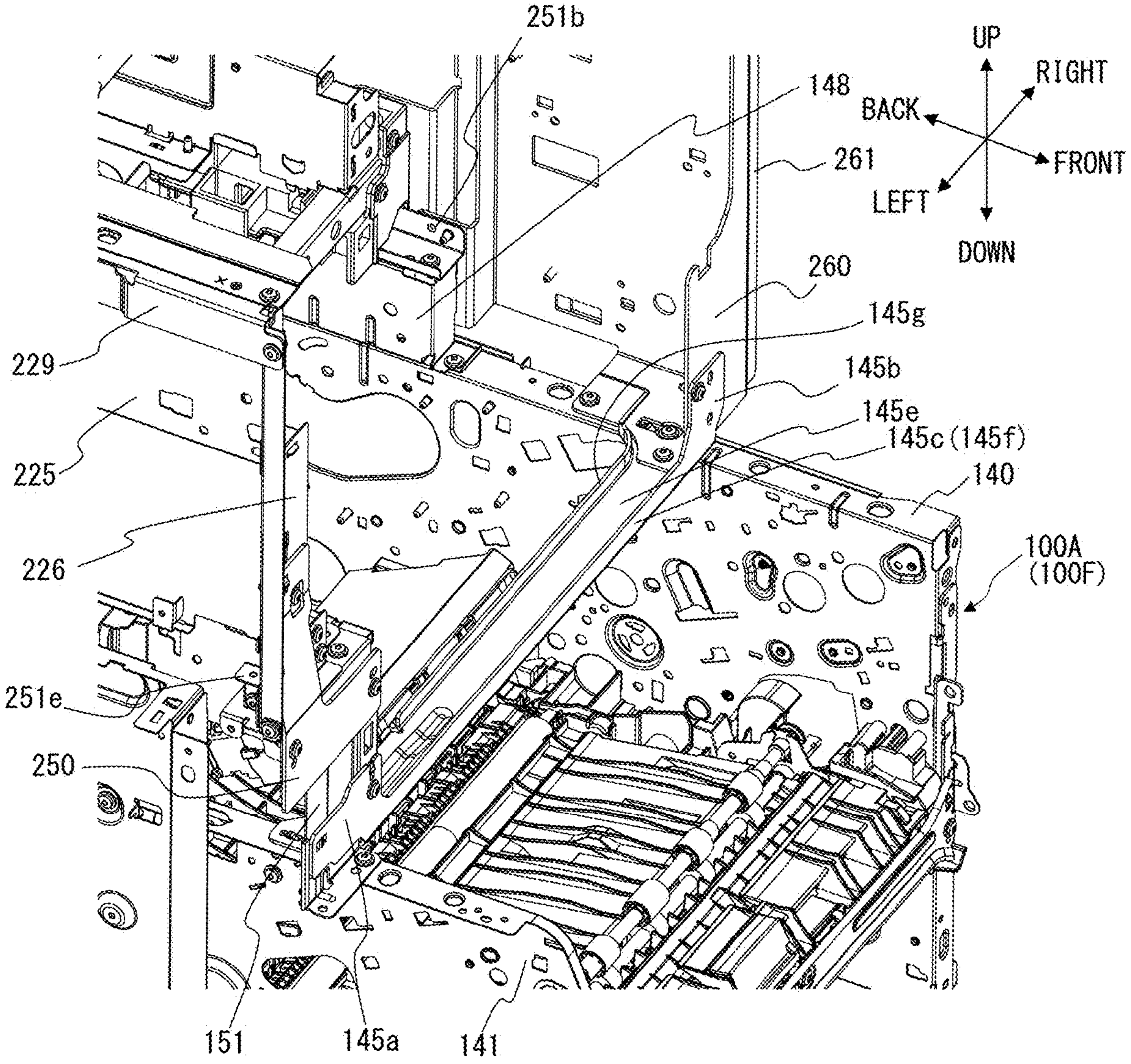
FIG. 16 is a perspective view illustrating part of the frame of the image forming apparatus of the first embodiment.

As illustrated in FIG. 16, the intermediate portion 145*c* includes a surface 145*e* (fifth surface) that is continuous to the side plate connection surfaces 145*d* on the left and right, and a surface 145*f* (sixth surface) that is continuous to the supporting member connection surfaces 145*a* and 145*b* on the left and the right. The surface 145*e* is a surface that spreads in a direction intersecting with the vertical direction. In the present embodiment, the surface 145*e* is a surface that extends in the left-right direction so as to connect the side plate connection surfaces 145*d* on the left and right, and spreads substantially in the front-back direction (horizontal direction). The surface 145*f* is a surface that spreads in a direction intersecting with the horizontal direction. In the present embodiment, the surface 145*f* is a surface that extends in the left-right direction so as to connect the supporting member connection surfaces 145*a* and 145*b* on the left and right, and spreads substantially in the up-down direction (vertical direction).

The surfaces 145*e* and 145*f* of the intermediate portion 145*c* are formed by the same metal plate as the side plate connection surfaces 145*d* and the supporting member connection surfaces 145*a* and 145*b*. When viewed in the left-right direction, the metal plate is bent between the surface 145*e* extending substantially in the front-back direction and the surface 145*f* extending substantially in the up-down direction. By shaping a cross-sectional shape of the intermediate portion 145*c* into a bent shape when viewed in the left-right direction, in comparison with a case where the cross-sectional shape of the intermediate portion 145*c* is linear, an effect of increasing the rigidity of the body frame 100F through the use of the front upper stay 145 can be further enhanced by reinforcing the rigidity of the front upper stay 145 itself. Further, since the surface 145*f* is a surface that is continuous to the supporting member connection surfaces 145*a* and 145*b*, it is possible to more stably support the upper unit (sheet processing apparatus 200) that is supported via the supporting member connection surfaces 145*a* and 145*b*.

To be noted, as illustrated in FIG. 16, the intermediate portion 145*c* can be formed into a rectangular one side open shaped cross-section in which the surface 145*e* extends upward from a front end of the surface 145*e* and a surface 145*g* extends upward from a back end of the surface 145*e*. Thereby, it is possible to further increase the rigidity of the front upper stay 145 and the body frame 100F.

As illustrated in FIG. 6, when viewed in the left-right direction, an upper end 145*cl* of the intermediate portion 145*c* of the front upper stay 145 is positioned at a position higher than an upper end 140*t* of the right side plate 140 and an upper end 141*t* of the left side plate 141. Further, the intermediate portion 145*c* of the front upper stay 145 is positioned below the sheet discharge tray 135. That is, in the present embodiment, when viewed in the sheet width direction, the upper end of the intermediate portion of the frame member is positioned above the upper surfaces of the first and second side plates and below the supporting portion.

Further, the intermediate portion 145*c* of the front upper stay 145 is arranged between the right and left plates 140 and 141 in the left-right direction. The intermediate portion 145*c* of the front upper stay 145 may support a lower surface of the sheet discharge tray 135.

The supporting member connection surfaces 145*a* and 145*b* are arranged outside of the sheet discharge tray 135 in the left-right direction. That is, in the left-right direction, the sheet discharge tray 135 is arranged between the supporting member connection surfaces 145*a* and 145*b*. At least one of the upper ends of the supporting member connection surfaces 145*a* and 145*b* projects above the upper end 145*cl* of the surface 145*f* of the intermediate portion 145*c* (refer to FIG. 2). That is, at least one of the upper ends of the third surface and the fourth surface of the frame member is positioned above the upper end of the intermediate portion of the frame member. In the present embodiment, both the upper ends of the supporting member connection surfaces 145*a* and 145*b* project above the upper end 145*cl* of the surface 145*f* of the intermediate portion 145*c*.

To be noted, it is preferable to enhance the rigidity of the front upper stay 145 by increasing a plate thickness in comparison with the front upper stay 1450 illustrated in FIG. 4. It is preferable to enhance the rigidity of the front upper stay 145 by increasing the plate thickness in comparison with the right and left side plates 140 and 141. The front upper stay 145 may be subjected to the drawing and the hemming processing for reinforcement.

Apparatus Supporting Member Left

Next, the apparatus supporting member left 151 that is arranged on the upper surface of the left side plate 141 in the image forming apparatus 1 of the first embodiment will be described. As illustrated in FIG. 2, the apparatus supporting member left 151 is arranged between the extension member left 150 and the front upper stay 145 in the front-back direction. The apparatus supporting member left 151 is connected to the upper surfaces of the extension member left 150 and the left side plate 141, and is connected to the supporting member connection surface 145*a* of the front upper stay 145.

Figure 13:
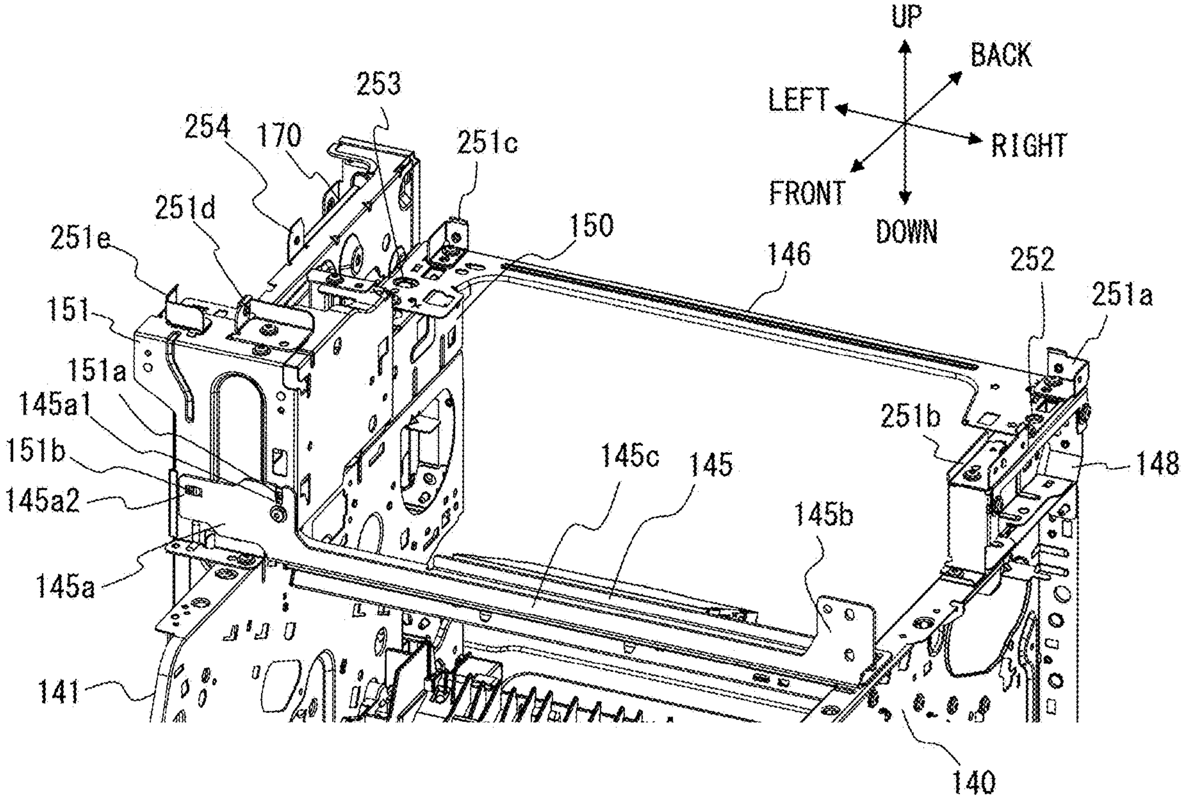
FIG. 13 is a perspective view illustrating part of the frame of the image forming apparatus of the first embodiment.

As illustrated in FIG. 13, positioning projections 151*a* and 151*b* are disposed on the apparatus supporting member left 151. The positioning projections 151*a* and 151*b* are in a projecting shape projecting forward from a front surface of the apparatus supporting member left 151, and, for example, is formed by drawing a part of a metal plate that forms the apparatus supporting member left 151.

Positioning holes 145*a*1 and 145*a*2 that respectively engage with the positioning projections 151*a* and 151*b* of the apparatus supporting member left 151 are disposed in the supporting member connection surface 145*a* of the front upper stay 145. By engaging the positioning holes 145*al* and 145*a*2 with the positioning projections 151*a* and 151*b*, the inclination of the extension member left 150 with respect to the upper surface of the left side plate 141 is suppressed.

Image Processing Unit

Next, an image processing unit 505 that is included in the image forming apparatus 1 of the first embodiment will be described. The image forming apparatus 1 of the present embodiment is configured to be capable of mounting the document reading apparatus 300 and the document conveyance apparatus 400 on the upper part of the printer body 100 by replacing an image processing unit from the image forming apparatus 2 (refer to FIGS. 4 and 5) of the variant example and also by changing a position of a fan.

Figure 7A:
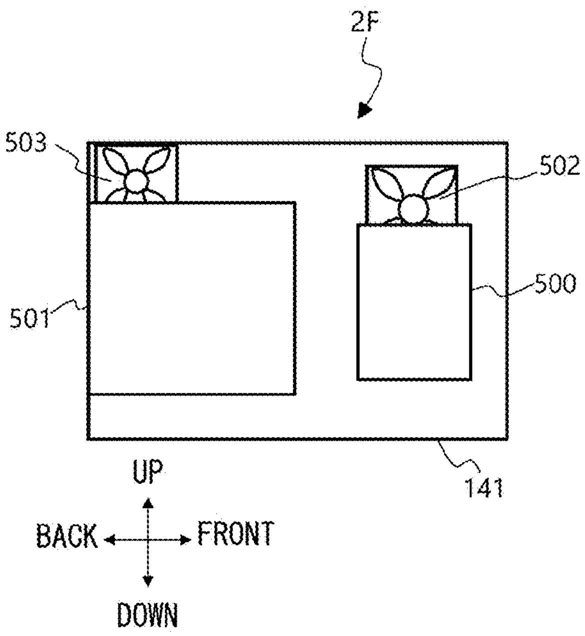
FIG. 7A is a schematic diagram illustrating a left side plate of the variant example.
Figure 7B:
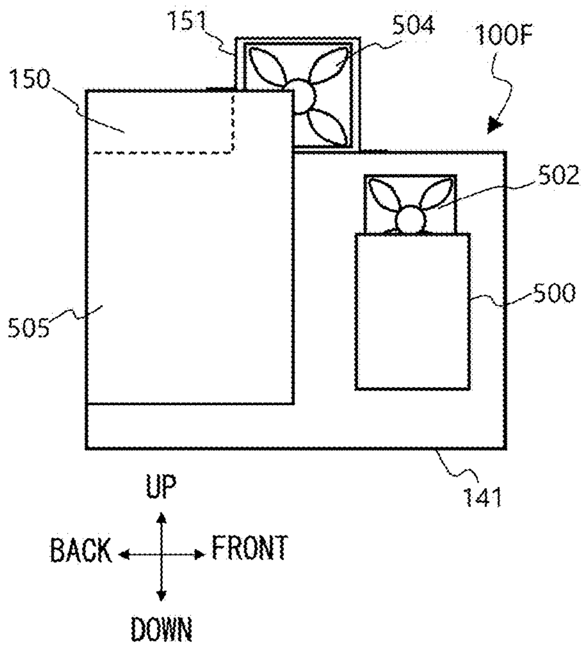
FIG. 7B is a schematic diagram illustrating a left side plate of the first embodiment.

FIG. 7A is a schematic diagram illustrating a state in which the frame 2F of the variant example is viewed from the left. FIG. 7B is a schematic diagram illustrating a state in which the body frame 100F of the first embodiment is viewed from the left.

As illustrated in FIG. 7A, the image forming apparatus 2 includes fans 502 and 503, an operation control unit 500, and an image processing unit 501. The fans 502 and 503 draw in exterior air, and circulate the air to an interior of the apparatus. The operation control unit 500 is a circuit substrate including a control circuit for controlling an operation (for example, image forming operation described above) of the image forming apparatus 2. The image processing unit 501 is a circuit substrate including a control circuit. This control circuit, for example, processes the image information sent from an external computer along with the printing instruction, and converts the image information into data for driving the laser scanner 104.

In the image forming apparatus 2, the fans 502 and 503, the operation control unit 500, and the image processing unit 501 are arranged on an outer side (left side) of the left side plate 141. The fan 502 is arranged above the operation control unit 500, and the fan 503 is arranged above the image processing unit 501. The fans 502 and 503, the operation control unit 500, and the image processing unit 501 are all positioned within a silhouette (rectangular outline) of the left side plate 141 when viewed from the left.

On the other hand, in the image forming apparatus 1 of the first embodiment that is a multi-function machine, so as to process the image information read by the document reading apparatus 300 and so as to accomplish the image processing for facsimile functionality, in comparison with the image forming apparatus 2 that is a single-function printer, a processing capacity required for the image processing unit is greater. Therefore, the image forming apparatus 1 of the first embodiment includes the image processing unit 505 that is larger than the image processing unit 501 (refer to FIG. 7A) of the variant example.

As illustrated in FIG. 7B, when viewed from the left, the image processing unit 505 of the first embodiment does not fit within the silhouette (rectangular outline) of the left side plate 141. In particular, part of an upper portion of the image processing unit 505 projects above the silhouette of the left side plate 141.

In the image forming apparatus 1 of the first embodiment, the extension member left 150 is disposed on the upper surface of the left side plate 141. The width of the image processing unit 505 in the up-down direction is contained within a range from a lower end of the left side plate 141 to an upper end of the extension member left 150.

Further, the image forming apparatus 1 of the first embodiment includes a fan 504 instead of the fan 503 (refer to FIG. 7A) of the image forming apparatus 2 of the variant example. When viewed from the left, the fan 504 is arranged inside of the apparatus supporting member left 151. To be noted, the apparatus supporting member left 151 includes a substantially rectangularly shaped recess portion when viewed from the left. This recess portion is opened toward the left, and houses the fan 504. The image processing unit 505 is arranged at the back of the operation control unit 500. At least part of the apparatus supporting member left 151 is positioned at the back of a back end of the operation control unit 500 in the front-back direction. Further, at least part of the apparatus supporting member left 151 is positioned in front of a front end of the image processing unit 505 in the front-back direction.

Figure 8:
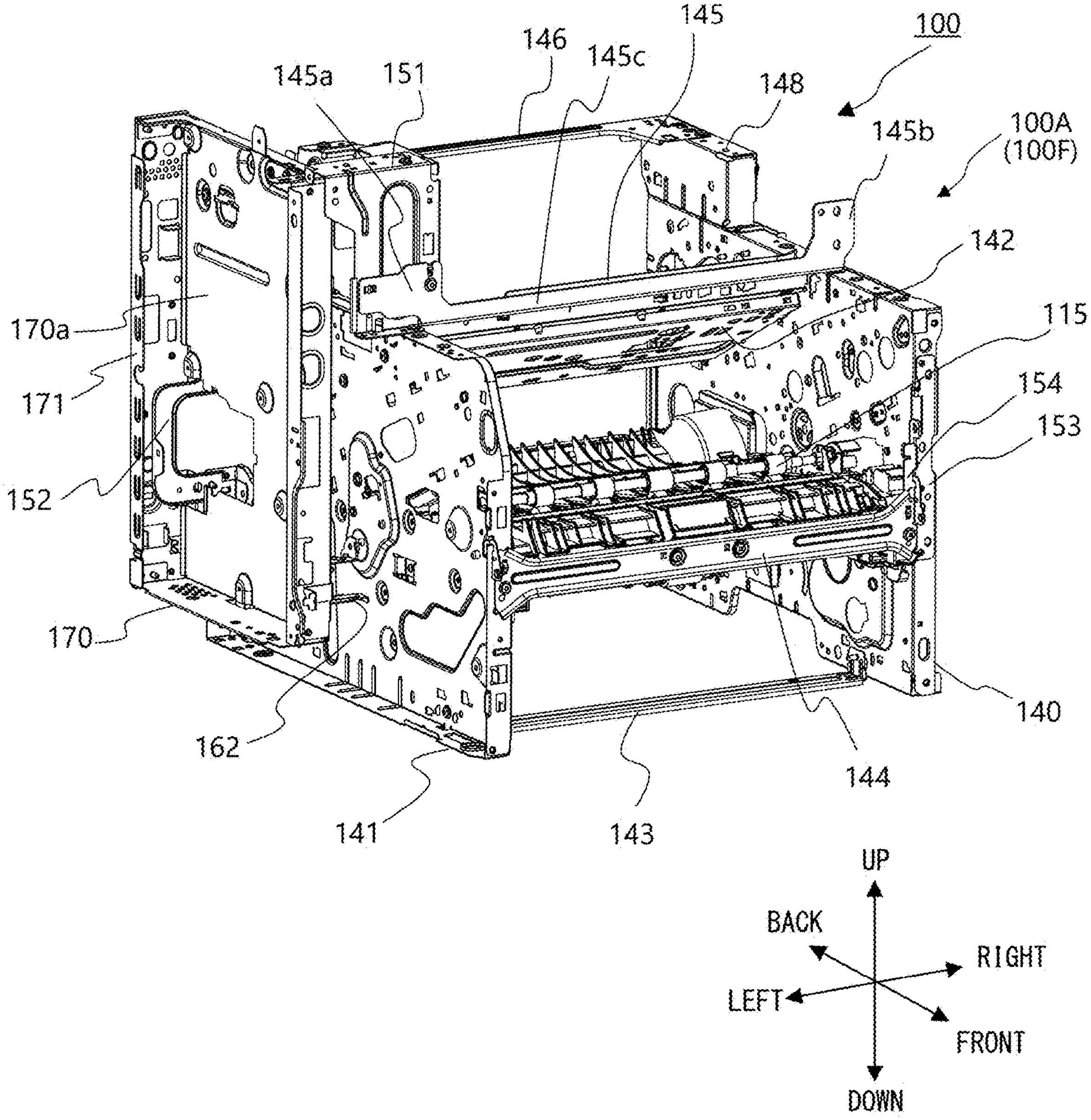
FIG. 8 is a perspective view illustrating part of the frame of the image forming apparatus of the first embodiment.
Figure 9:
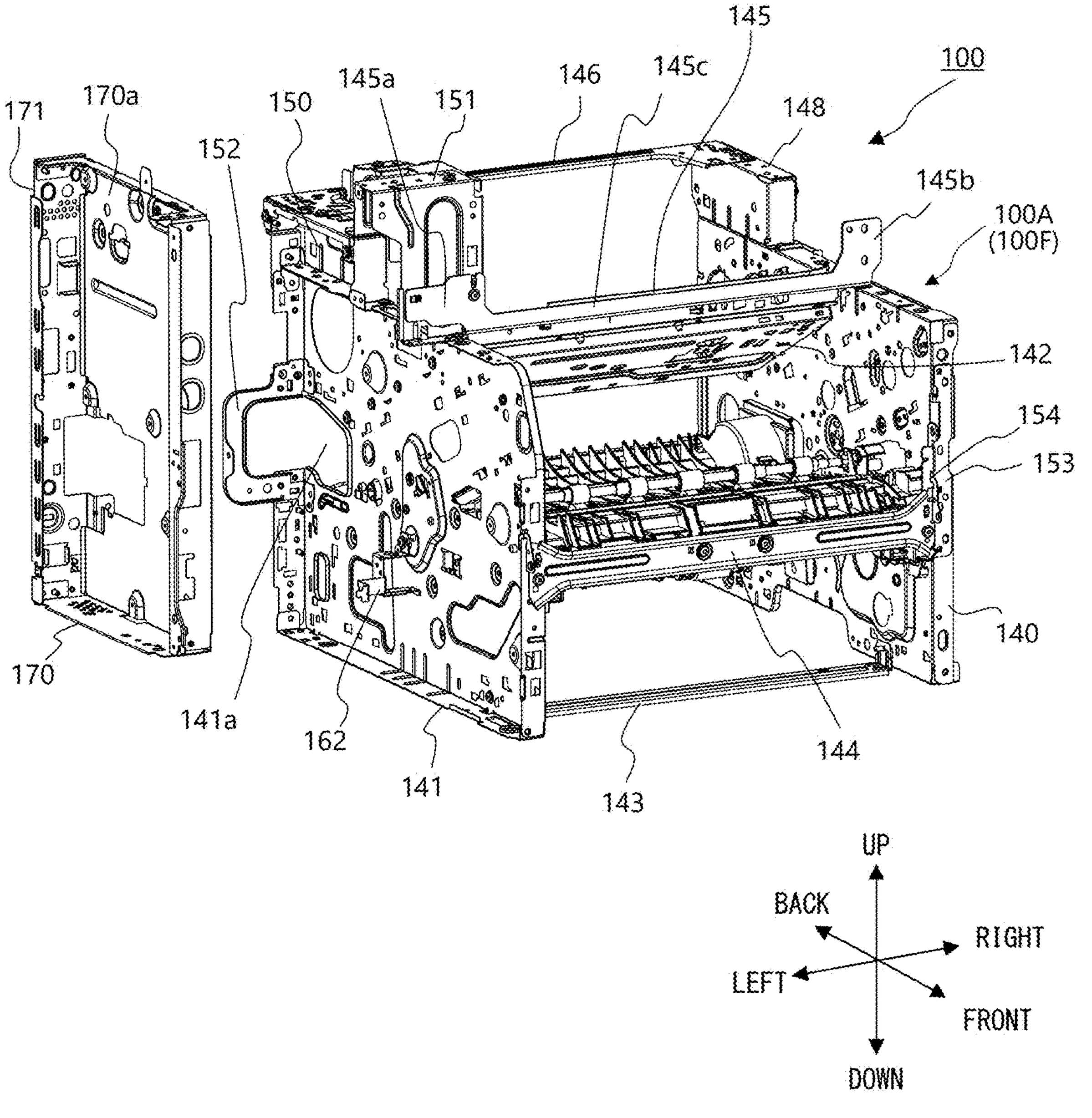
FIG. 9 is a perspective view illustrating part of the frame of the image forming apparatus of the first embodiment.

Next, using FIGS. 8 and 9, an image processing unit case 170, serving as a case member to which the image processing unit 505 is attached, will be described. FIG. 8 is a perspective view illustrating the body frame 100F to which the image processing unit case 170 is mounted. FIG. 9 is a perspective view illustrating the body frame 100F before the image processing unit case 170 is mounted. The image processing unit case 170 is a part of the casing 100A of the printer body 100.

As illustrated in FIGS. 8 and 9, a case body 170*a* and an interface plate 171 are integrated in the image processing unit case 170, and the image processing unit case 170 is formed substantially in a box shape. A plurality of holes are formed in the interface plate 171 to accommodate the attachment of connectors, such as a local area network (LAN) connector and a universal serial bus (USB) connector disposed in the image processing unit 505, with respect to an interface unit.

Part of the image processing unit case 170 projects above the upper surface of the left side plate 141. A mounting plate 162 is disposed to the left side plate 141. By fastening the case body 170*a* to the mounting plate 162 and by fastening the interface plate 171 to the back surface of the left side plate 141, the image processing unit case 170 is secured to the left side plate 141. Further, the image processing unit case 170 is fastened with respect to each of the extension member left 150 and the apparatus supporting member left 151.

As described above, in the present embodiment, the apparatus supporting member left 151 and the left side plate 141 are connected via the image processing unit case 170. In other words, the case member is connected to each of the second side plate and the second supporting member. Therefore, in comparison with a configuration in which the apparatus supporting member left 151 and the left side plate 141 are not connected via the image processing unit case 170, the inclination of the apparatus supporting member left 151 with respect to the left side plate 141 is suppressed. By suppressing the inclination of the apparatus supporting member left 151, the inclination of the upper unit (sheet processing apparatus 200) that is supported by the apparatus supporting member left 151 is also suppressed.

Further, since the image processing unit case 170 is further connected also to the extension member left 150, the extension member left 150 and the left side plate 141 are connected via the image processing unit case 170. Therefore, in comparison with a configuration in which the extension member left 150 and the left side plate 141 are not connected via the image processing unit case 170, the inclination of the extension member left 150 with respect to the left side plate 141 is suppressed. By suppressing the inclination of the extension member left 150, the inclination of the upper unit (sheet processing apparatus 200) that is supported by the extension member left 150 is also suppressed.

Frame Configuration of Sheet Processing Apparatus

Figure 10:
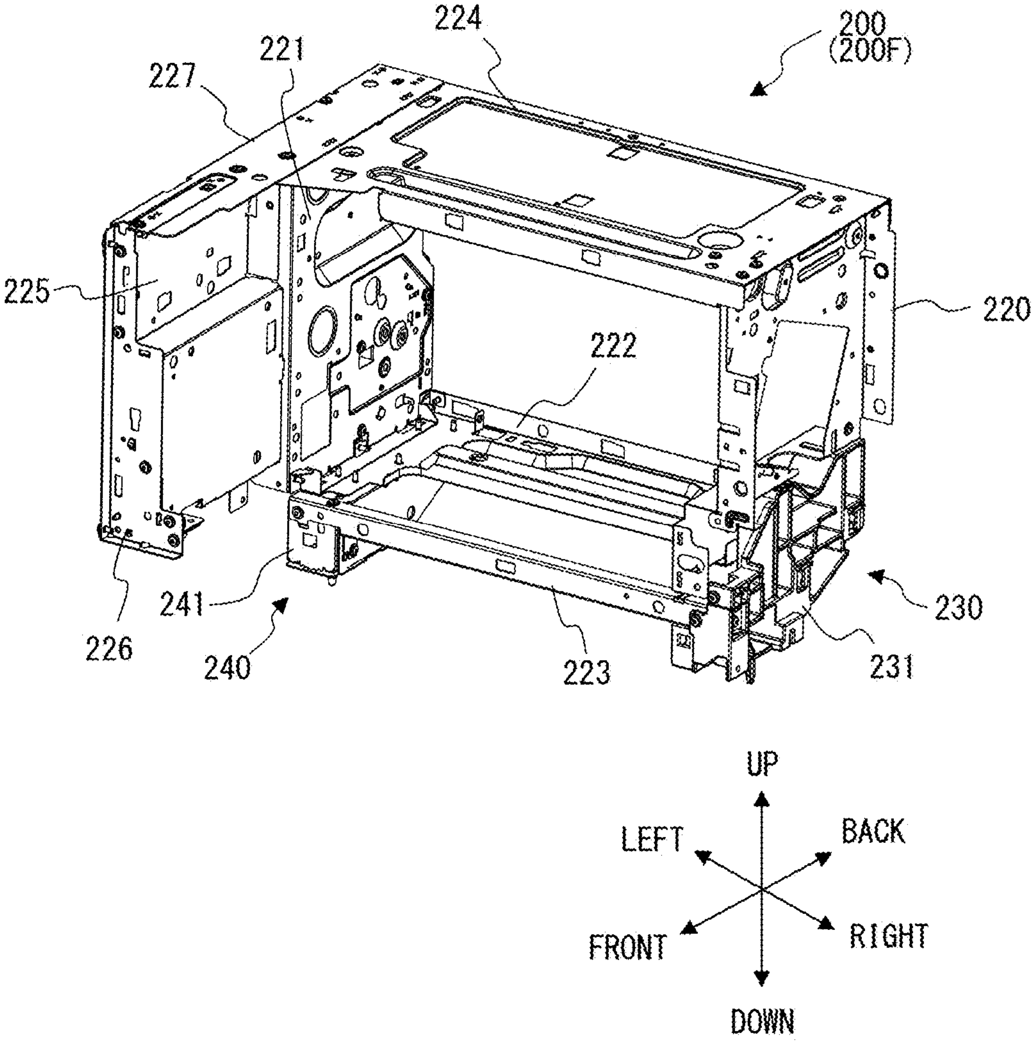
FIG. 10 is a perspective view illustrating a frame of a sheet processing apparatus of the first embodiment.
Figure 11:
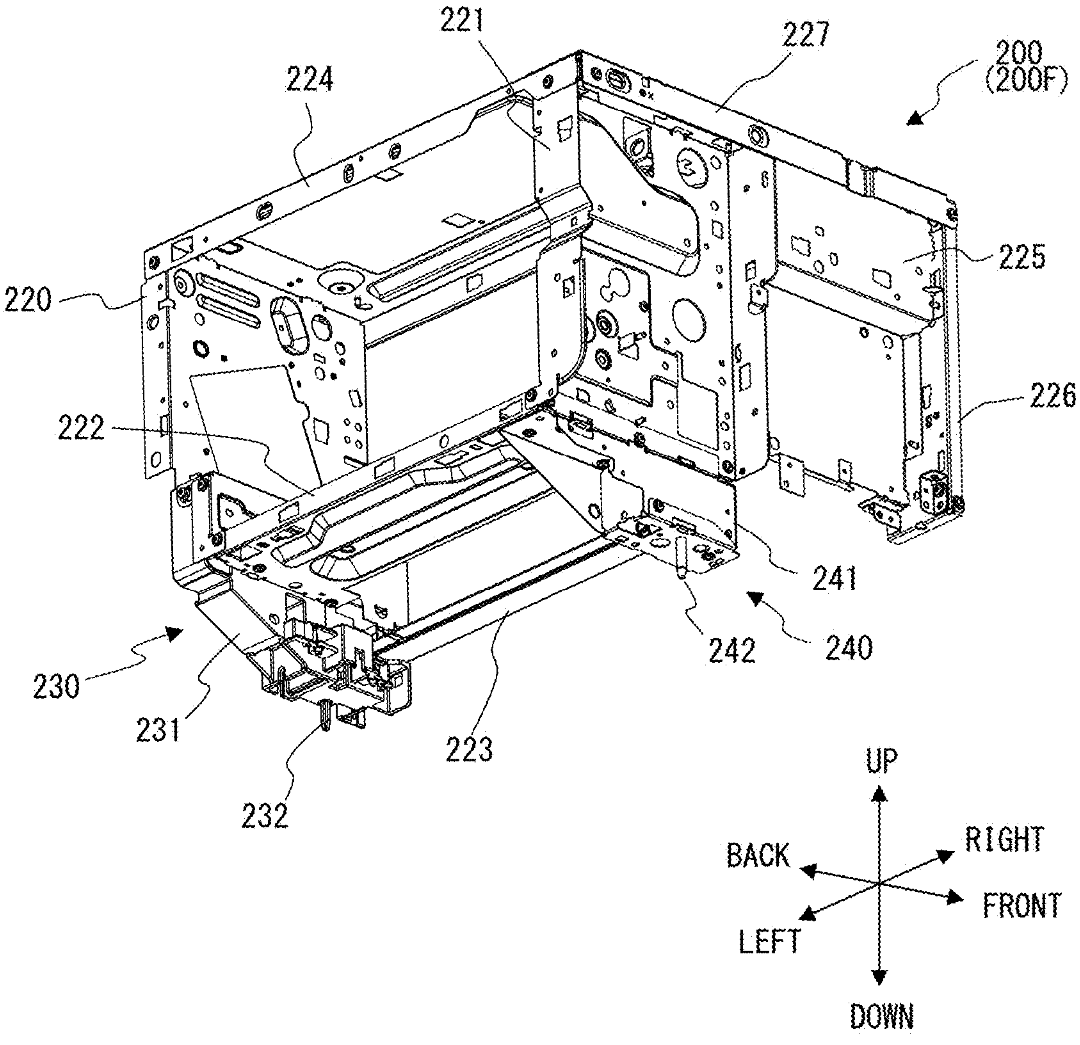
FIG. 11 is a perspective view illustrating the frame of the sheet processing apparatus of the first embodiment.

Using FIGS. 10 and 11, a frame configuration of the sheet processing apparatus 200 will be described. FIGS. 10 and 11 are perspective views illustrating the frame 200F of the sheet processing apparatus 200.

The frame 200F of the sheet processing apparatus 200 includes a right side plate 220, a left side plate 221, a top plate 224, a bottom plate 222, and a front bottom stay 223. The right, left, top, and bottom plates 220, 221, 224, and 222 and the front bottom stay 223 are fastened to one another, and form a structure substantially identical to a box shape.

Further, the frame 200F includes an electrical component installation plate 225, a front plate 226, and a reinforcing plate 227. The electrical component installation plate 225 and the front plate 226 are mounted to a front surface of the left side plate 221, and are arranged at positions projecting forward with respect to the box shape formed by the right, left, top, bottom plates 220, 221, 224, and 222 and the front bottom stay 223. The reinforcing plate 227 is fastened to upper surfaces of the light side plate 221 and the electrical component installation plate 225. The left side plate 221 and the electrical component installation plate 225 are firmly connected through the reinforcing plate 227.

A right side mounting portion 230 and a left side mounting portion 240 are disposed to a lower part of the sheet processing apparatus 200. The right side and left side mounting portions 230 and 240 are mounting portions for mounting the sheet processing apparatus 200 onto the printer body 100. The right side and left side mounting portions 230 and 240 are positioning portions for positioning the sheet processing apparatus 200 with respect to the printer body 100.

The right side mounting portion 230 includes a right side mounting member 231 made from resin. On the right side mounting member 231, a first positioning shaft 232 that engages with the printer body 100 projects. The left side mounting portion 240 includes a left side mounting member 241, which is formed into a box shape using a metal plate. On the left side mounting member 241, a second positioning shaft 242 that engages with the printer body 100 projects.

Figure 12:
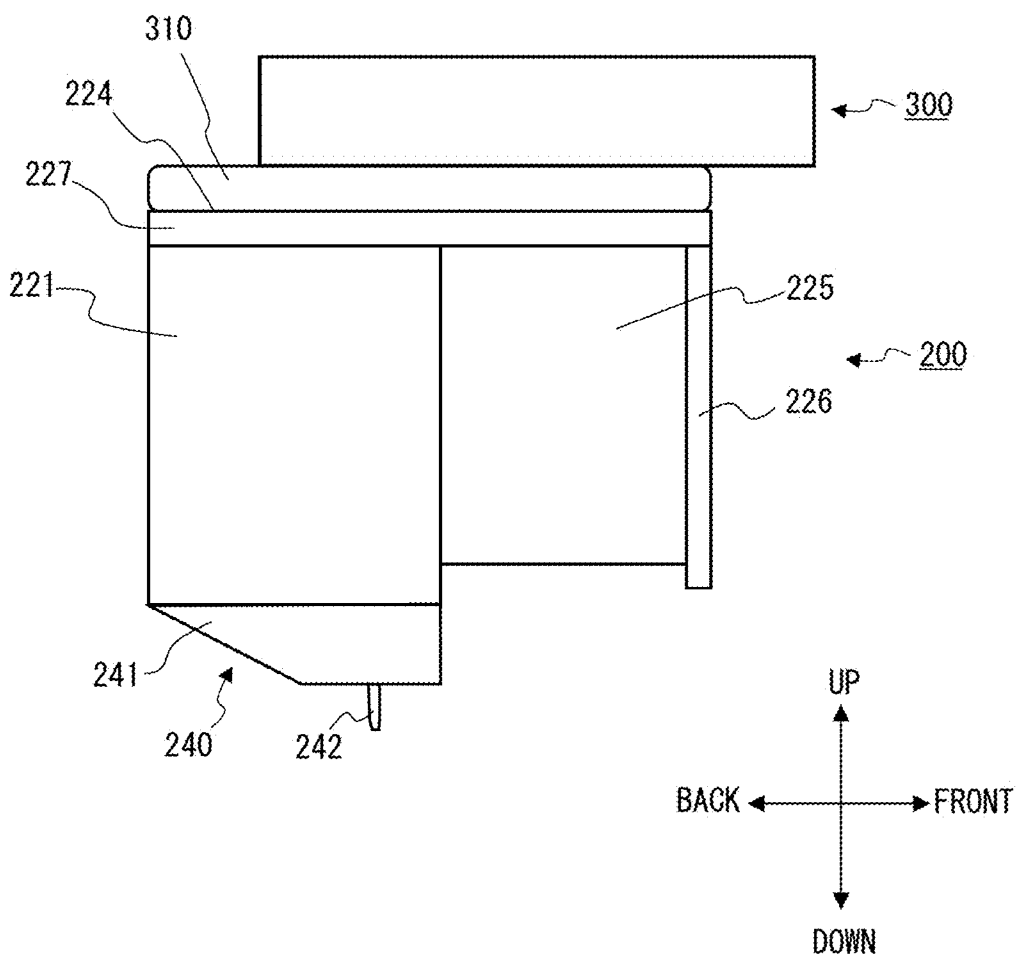
FIG. 12 is a schematic diagram illustrating a connection configuration between the sheet processing apparatus and a document reading apparatus of the first embodiment.

Connection Configuration of Sheet Processing Apparatus and Document Reading Apparatus Using FIG. 12, a connection configuration of the sheet processing apparatus 200 and the document reading apparatus 300 will be described. FIG. 12 is a schematic diagram illustrating the sheet processing apparatus 200 and the document reading apparatus 300 as viewed from the left.

As illustrated in FIG. 12, a base 310 is disposed on the top plate 224 of the sheet processing apparatus 200. The base 310 may be pre-assembled into the sheet processing apparatus 200, or may be a separate member from both the sheet processing apparatus 200 and the document reading apparatus 300. The base 310 is a supporting member that supports a unit disposed above the sheet processing apparatus 200. The base 310 is made from resin, and also incorporates functions such as a cable guide to guide cables that connect the document reading apparatus 300 and the sheet processing apparatus 200 or the printer body 100. In the present embodiment, the document reading apparatus 300 is installed on the base 310, and the document reading apparatus 300 and the sheet processing apparatus 200 are integrated via the base 310.

To be noted, the document conveyance apparatus 400 is integrated with the document reading apparatus 300 in advance by being connected to the document reading apparatus 300 via, for example, a hinge portion. That is, by mounting the document reading apparatus 300 onto the base 310, also the document conveyance apparatus 400 is mounted to the image forming apparatus 1.

Connection Configuration of Printer Body and Sheet Processing Apparatus

Using FIGS. 13 to 16, a connection configuration of the printer body 100 and the sheet processing apparatus 200 will be described. FIG. 13 is a perspective view illustrating the extension member right 148, the extension member left 150, and the apparatus supporting member left 151, and corresponds to an enlarged view of an upper part of FIG. 2. FIGS. 14, 15, and 16 are perspective views illustrating a frame configuration of the image forming apparatus 1 with the sheet processing apparatus 200 installed on the top of the printer body 100.

First, a positioning configuration of the sheet processing apparatus 200 and the printer body 100 will be described. As illustrated in FIG. 13, a positioning hole right 252 and a positioning hole left 253, serving as positioning portions for positioning the sheet processing apparatus 200, are disposed in the printer body 100. The positioning hole right 252 is formed in the upper surface of the extension member right 148, and the positioning hole left 253 is formed in the upper surface of the extension member left 150.

The sheet processing apparatus 200 is configured such that, by respectively engaging the first and second positioning shafts 232 (refer to FIG. 11) and 242 with the positioning hole right 252 and the positioning hole left 253, a position of the sheet processing apparatus 200 is determined with respect to the printer body 100.

Next, the connection of the sheet processing apparatus 200 and the printer body 100 will be described. As illustrated in FIG. 13, a plurality of brackets 251*a* to 251*e* for fastening the sheet processing apparatus 200 and the printer body 100 are installed on the extension member right 148, the extension member left 150, and the apparatus supporting member left 151. In particular, the brackets 251*a* and 251*b* are fastened to the upper surface of the extension member right 148. The bracket 251*c* is fastened to the upper surface of the extension member left 150. The brackets 251*d* and 251*e* are fastened to the upper surface of the apparatus supporting member left 151. Further, a fastening portion 254 for fastening the sheet processing apparatus 200 and the printer body 100 is disposed also on an upper end portion of the image processing unit case 170.

The sheet processing apparatus 200 is installed on the extension member right 148, the extension member left 150, and the apparatus supporting member left 151. The right side mounting portion 230 (refer to FIGS. 10 and 11) of the sheet processing apparatus 200 is fastened to the brackets 251*a* and 251*b*. The left side mounting portion 240 (refer to FIGS. 10 and 11) of the sheet processing apparatus 200 is fastened to the bracket 251*c* and the fastening portion 254 of the image processing unit case 170. The front plate 226 (refer to FIGS. 10 and 11) of the sheet processing apparatus 200 is fastened to the brackets 251*d* and 251*e*. As described above, the sheet processing apparatus 200 is connected to the printer body 100 via the brackets 251*a* to 251*e* and the image processing unit case 170.

As illustrated in FIG. 14, the apparatus supporting member right inner 260 and an apparatus supporting member right outer 261 are disposed on the upper surface of the right side plate 140 between the extension member right 148 and the front upper stay 145.

The apparatus supporting member right inner 260 is an example of a first supporting member, and the apparatus supporting member left 151 is an example of a second supporting member. The apparatus supporting member right inner 260 is formed by one or more metal plates. The apparatus supporting member right inner 260 may be formed by a bent metal plate, and may be formed by a plurality of metal plates. The apparatus supporting member left 151 is formed by one or more metal plates. The apparatus supporting member left 151 may be formed by a bent metal plate, and may be formed by a plurality of metal plates. The apparatus supporting member right inner 260 supports the sheet processing apparatus 200 on the right side of the image forming apparatus 1. That is, the apparatus supporting member right inner 260 supports the upper unit on the first side in the sheet width direction. The apparatus supporting member left 151 supports the sheet processing apparatus 200 on the left side of the image forming apparatus 1. That is, the apparatus supporting member left 151 supports the upper unit on the second side opposite to the first side in the sheet width direction.

To be noted, the first and second supporting members are not limited to a member that is directly connected to the upper unit, but may be a member that supports the upper unit by being connected to the other member which is connected to the upper unit. In the present embodiment, the apparatus supporting member right inner 260, serving as the first supporting member, supports the sheet processing apparatus 200 by being connected to the apparatus supporting member right outer 261 connected to the sheet processing apparatus 200. The apparatus supporting member right inner 260 and the apparatus supporting member right outer 261 may be formed as an integrated member.

The apparatus supporting member right inner 260 is mounted to the upper surface of the right side plate 140, and is also mounted to the supporting member connection surface 145*b* of the front upper stay 145. More particularly, the apparatus supporting member right inner 260 is fastened to the upper surface of the right side plate 140, and is fastened to supporting member connection surface 145*b* of the front upper stay 145. Further, the apparatus supporting member right inner 260 is fastened to the bracket 251*b* (refer to FIG. 16).

The apparatus supporting member right outer 261 is fastened to a right surface of the apparatus supporting member right inner 260. Further, an upper connection surface 261*a* of the apparatus supporting member right outer 261 is connected to the frame 200F of the sheet processing apparatus 200. Further, the apparatus supporting member right outer 261 is also fastened to the right side mounting member 231 (refer to FIGS. 10 and 11) of the sheet processing apparatus 200.

As described above, in the present embodiment, the frame 200F of the sheet processing apparatus 200 and the body frame 100F of the printer body 100 are connected via the apparatus supporting member right inner 260 and the apparatus supporting member right outer 261. Therefore, in comparison with a case where the frame 200F of the sheet processing apparatus 200 and the body frame 100F of the printer body 100 are not connected via the apparatus supporting member right inner 260 and the apparatus supporting member right outer 261, it is possible to more firmly connect the sheet processing apparatus 200 and the printer body 100.

Further, the upper connection surface 261*a* of the apparatus supporting member right outer 261 is fastened to the top plate 224 of the sheet processing apparatus 200. That is, the apparatus supporting member right inner 260 is connected to the upper surface of the sheet processing apparatus 200 via the apparatus supporting member right outer 261 that is connected to the apparatus supporting member right inner 260. With this configuration, it is possible to more firmly connect the sheet processing apparatus 200 and the printer body 100. To be noted, it is acceptable if at least one of the first and second supporting members is connected to the upper surface of the upper unit.

Further, as illustrated in FIG. 14, the image forming apparatus 1 includes a connecting plate 250. The connecting plate 250 is fastened to each of the plate 226 of the sheet processing apparatus 200 and a front surface of the apparatus supporting member left 151, and connects the front plate 226 and the apparatus supporting member left 151.

As described above, in the present embodiment, the frame 200F of the sheet processing apparatus 200 and the body frame 100F of the printer body 100 are connected via the apparatus supporting member left 151 and the connecting plate 250. Therefore, in comparison with a case where the frame 200F of the sheet processing apparatus 200 and the body frame 100F of the printer body 100 are not connected via the apparatus supporting member left 151 and the connecting plate 250, it is possible to more firmly connect the sheet processing apparatus 200 and the printer body 100.

As described above, the sheet processing apparatus 200 is installed on the extension member right 148, the extension member left 150, and the apparatus supporting member left 151, and is connected to the printer body 100 via the plurality of brackets 251*a* to 251*e* and the image processing unit case 170. On the back side of the image forming apparatus 1, a part (i.e., upstream part in the sheet discharge direction D1) of the sheet processing apparatus 200 is supported by the extension member right 148 and the extension member left 150, and, on the front side of the image forming apparatus 1, another part (i.e., downstream part in the sheet discharge direction D1) of the sheet processing apparatus 200 is supported by the apparatus supporting member right inner 260 and the apparatus supporting member left 151.

The apparatus supporting member right inner 260, serving as the first supporting member, is disposed on a right front side of the image forming apparatus 1. The apparatus supporting member right inner 260 is installed on the upper surface of the right side plate 140 of the body frame 100F, and is fastened to the supporting member connection surface 145*b* that is an upright surface of the front upper stay 145. Thereby, the inclination of the apparatus supporting member right inner 260 with respect to the right side plate 140 is suppressed. Then, the inclination of the sheet processing apparatus 200 itself with respect to the right side plate 140 is also suppressed by fastening the apparatus supporting member right outer 261 to the apparatus supporting member right inner 260 and the top plate 224 of the sheet processing apparatus 200.

The apparatus supporting member left 151, serving as the second supporting member, is disposed on a left front side of the image forming apparatus 1. The apparatus supporting member left 151 is mounted to the upper surface of the left side plate 141 of the body frame 100F and the upper surface of the extension member left 150, and is mounted to the supporting member connection surface 145*a* that is the upright surface of the front upper stay 145. More particularly, the apparatus supporting member left 151 is installed on the upper surface of the left side plate 141 of the body frame 100F and the upper surface of the extension member left 150, and is fastened to the supporting member connection surface 145*a* that is the upright surface of the front upper stay 145. By engaging the positioning projections 151*a* and 151*b* of the apparatus supporting member left 151 with the positioning holes 145*a*1 and 145*a*2 of the supporting member connection surface 145*a*, the inclination of the apparatus supporting member left 151 with respect to the left side plate 141 is suppressed. Then, the sheet processing apparatus 200 is connected to the apparatus supporting member left 151 via the brackets 251*d* and 251*e*, and, on the front side of the apparatus, the apparatus supporting member left 151 and the front plate 226 of the sheet processing apparatus 200 are connected by the connecting plate 250. Thereby, the inclination of the sheet processing apparatus 200 itself with respect to the left side plate 141 is also suppressed.

According to the present embodiment described above, the supporting member connection surfaces 145*a* and 145*b* of the front upper stay 145 that is arranged on the front side of the image forming apparatus 1 are respectively connected to the apparatus supporting member left 151 and the apparatus supporting member right inner 260. That is, the front upper stay 145 (frame member) that is arranged downstream of the discharge port 100*d* in the sheet discharge direction D1 includes the third surface (supporting member connection surface 145*b*) that is connected to the apparatus supporting member right inner 260, and the fourth surface (supporting member connection surface 145*a*) that is connected to the apparatus supporting member left 151. Therefore, it becomes possible to increase the rigidity of the image forming apparatus in its downstream part in the sheet discharge direction.

A user normally stands in front of the image forming apparatus 1 to perform operations such as opening and closing the document conveyance apparatus 400 and removing the sheet from the sheet discharge tray 135. At that time, if the casing 100A of the printer body 100 and the upper unit do not seem integrated, it may give an impression of insufficient rigidity.

Further, the image forming apparatus 1 is equipped with wheels at the bottom of the apparatus for transporting the whole equipment, or the whole equipment is mounted on a cart. When moving the whole equipment, the user or an operator may sometimes place hands on the document reading apparatus 300 or the sheet processing apparatus 200 to overcome steps or gaps, or to move across inclined surfaces. At this time, if the frame of the sheet processing apparatus 200 becomes twisted or tilted, there is a possibility that an impression of a lack of unity and rigidity between the casing 100A of the printer body 100 and the upper unit may be created.

According to the present embodiment, it is possible to provide the image forming apparatus that can increase the rigidity in its part downstream from the discharge port in the sheet discharge direction.

Second Embodiment

Using FIG. 17, a second embodiment will be described. Hereinafter, unless otherwise specifically stated, elements on which reference characters common to the first embodiment are put possess substantially the same configuration and function described in the first embodiment, and portions different from the first embodiment will be mainly described.

In the second embodiment, the document reading apparatus 300 and the document conveyance apparatus 400 are mounted on the top of the casing 100A of the printer body 100. The document reading apparatus 300 is an example of the upper unit that is arranged above the casing 100A.

Figure 17:
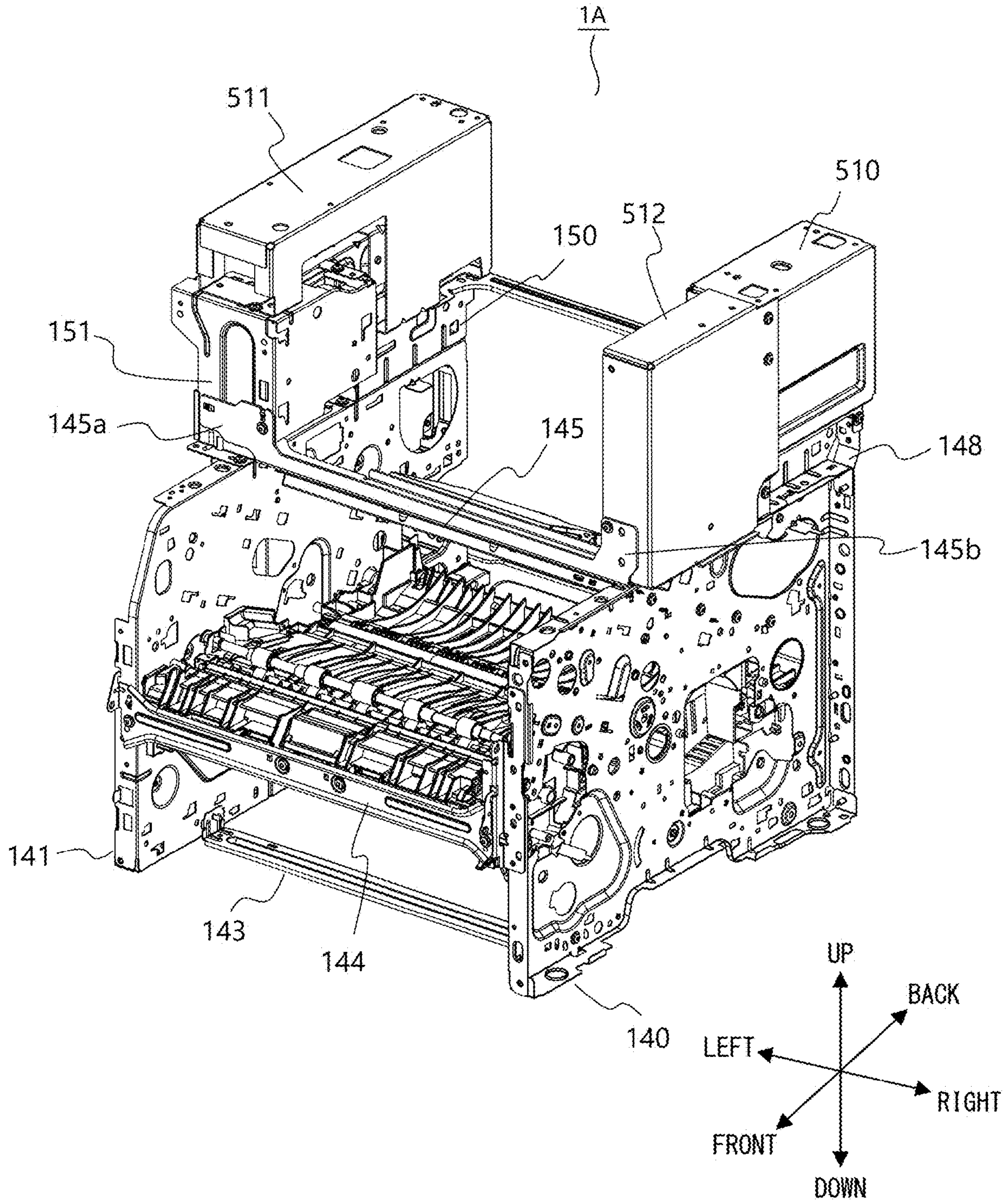
FIG. 17 is a perspective view illustrating a frame of an image forming apparatus of a second embodiment.

FIG. 17 is a perspective view illustrating a frame configuration of an image forming apparatus 1A of the second embodiment. In the second embodiment, the extension member right 148 and an apparatus supporting member right 512 are disposed on the right side plate 140, and a column member 510 is disposed on the extension member right 148. Further, the extension member left 150 and the apparatus supporting member left 151 are disposed on the left side plate 141, and a column member 511 is disposed on the extension member left 150 and the apparatus supporting member left 151. The document reading apparatus 300 (refer to FIG. 1) is installed on upper surfaces of the column members 510 and 511.

As describe above, the extension member right 148, the extension member left 150, the apparatus supporting member right 512, and the apparatus supporting member left 151 are provided with the column members 510 and 511 between them and the document reading apparatus 300. Thereby, it is possible to increase a distance from the sheet discharge tray 135 (refer to FIG. 1) of the printer body 100 to a bottom surface of the document reading apparatus 300, and it is possible to increase the number of sheets that can be supported by the sheet discharge tray 135.

The apparatus supporting member right 512 is arranged at the back of the front upper stay 145 and in front of the extension member right 148. The apparatus supporting member right 512 is fastened to the supporting member connection surface 145*b* of the front upper stay 145, and is also fastened to the column member 510. Further, the upper surface of the column member 510 and an upper surface of the apparatus supporting member right 512 are positioned substantially at the same height in a product height direction. Then, the document reading apparatus 300 is connected to the upper surfaces of the column members 510 and 511, and the upper surface of the apparatus supporting member right 512. Thereby, the document reading apparatus 300 and the printer body 100 are connected.

According to the configuration described above, the document reading apparatus 300 is connected to the printer body via the extension member right 148, the extension member left 150, the apparatus supporting member left 151, the apparatus supporting member right 512, and the column members 510 and 511.

The apparatus supporting member right 512, serving as the first supporting member, is disposed on a right front side of the image forming apparatus 1A. The apparatus supporting member right 512 is connected to the upper surface of the right side plate 140 of the body frame 100F, and is connected to the supporting member connection surface 145*b* that is the upright surface of the front upper stay 145. Thereby, the inclination of the apparatus supporting member right 512 with respect to the right side plate 140 is suppressed. Then, the inclination of the document reading apparatus 300 itself with respect to the right side plate 140 is also suppressed by connecting the apparatus supporting member right 512 and the document reading apparatus 300.

The apparatus supporting member left 151, serving as the second supporting member, is disposed on a left front side of the image forming apparatus 1A. With a configuration similar to the first embodiment, the inclination of the apparatus supporting member left 151 with respect to the left side plate 141 is suppressed. Then, the document reading apparatus 300 is connected to the apparatus supporting member left 151 via the column member 511. Thereby, the inclination of the document reading apparatus 300 itself with respect to the left side plate 141 is also suppressed.

According to the present embodiment described above, the supporting member connection surfaces 145*a* and 145*b* of the front upper stay 145 arranged on the front side of the image forming apparatus 1A are respectively connected to the apparatus supporting member left 151 and the apparatus supporting member right 512. That is, the front upper stay

145 (frame member) that is arranged downstream of the discharge port 100*d* in the sheet discharge direction D1 includes the third surface (supporting member connection surface 145*b*) that is connected to the apparatus supporting member right 512, and the fourth surface (supporting member connection surface 145*a*) that is connected to the apparatus supporting member left 151. Therefore, it becomes possible to increase the rigidity of the image forming apparatus 1A in its downstream part in the sheet discharge direction.

According to the present embodiment, it is possible to provide the image forming apparatus that can increase the rigidity in its part downstream of the discharge port in the sheet discharge direction.

Modified Embodiments

While, in each embodiment described above, as examples of the upper unit, the sheet processing apparatus 200 and the document reading apparatus 300 are exemplified, the upper unit may be any other unit.

Further, in the first embodiment, the image forming apparatus 1 including the sheet processing apparatus 200, the document reading apparatus 300, and the document conveyance apparatus 400 is exemplified, and the image forming apparatus 2, serving as the single-function printer, is exemplified as the variant example of the first embodiment. As a further variant example of the first embodiment, the image forming apparatus may be a single-function printer which includes the extension member right 148 and the extension member left 150, but does not include the sheet processing apparatus 200, the document reading apparatus 300, and the document conveyance apparatus 400.

The image forming portion 100B described above is an example of the image forming portion. The image forming portion may be, for example, an electrophotographic mechanism of an intermediate transfer system that transfers the toner image formed on the photosensitive drum 102 onto the sheet via an intermediate transfer member. The image forming portion may be a mechanism that forms a color image using developers of a plurality of colors. Further, the image forming portion may utilize mechanisms other than the electrophotographic method, such as inkjet or offset printing methods.

As described above, according to the present disclosure, it is possible to provide the image forming apparatus that can increase the rigidity in its part downstream of the discharge port in the sheet discharge direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075874, filed on May 1, 2023, which is hereby incorporated by reference herein in its entirety.

What is claimed is:

1. An image forming apparatus comprising:

a casing configured to accommodate an image forming portion that is configured to form an image on a sheet, the casing including a discharge port through which the sheet on which the image has been formed by the image forming portion is discharged in a sheet discharge direction;

an upper unit arranged above the casing;

a first supporting member supporting the upper unit; and a second supporting member supporting the upper unit, wherein the casing includes:

a first side plate extending in a direction intersecting with a sheet width direction perpendicular to the sheet discharge direction, a second side plate extending in a direction intersecting with the sheet width direction, and a frame member arranged downstream of the discharge port in the sheet discharge direction and configured to connect the first side plate and the second side plate, wherein, in the sheet width direction, the first side plate and the first supporting member are arranged on a first side with respect to a center of the casing, and the second side plate and the second supporting member are arranged on a second side opposite to the first side with respect to the center of the casing, and wherein the frame member includes a first surface connected to the first side plate, a second surface connected to the second side plate, a third surface connected to the first supporting member, and a fourth surface connected to the second supporting member.

2. The image forming apparatus according to claim 1, wherein the casing includes a supporting portion that is configured to support the sheet discharged from the discharge port, and wherein the frame member is arranged at a position at which a distance to a downstream end of the supporting portion in the sheet discharge direction is shorter than a distance to an upstream end of the supporting portion in the sheet discharge direction.

3. The image forming apparatus according to claim 1, wherein the first surface is connected to an upper surface of the first side plate, wherein the second surface is connected to an upper surface of the second side plate, wherein the third surface is connected to the first supporting member at a position above the upper surface of the first side plate, and wherein the fourth surface is connected to the second supporting member at a position above the upper surface of the second side plate.

4. The image forming apparatus according to claim 3, wherein the first surface, the second surface, the third surface, and the fourth surface are formed by a single metal plate, and wherein the metal plate is bent between the first surface and the third surface, and is bent between the second surface and the third surface.

5. The image forming apparatus according to claim 4, wherein the frame member includes:

a fifth surface that extends in the sheet width direction and is configured to connect the first surface and the second surface, and a sixth surface that extends in the sheet width direction and is configured to connect the third surface and the fourth surface, and wherein, when viewed in the sheet width direction, the metal plate is bent between the fifth surface and the sixth surface.

6. The image forming apparatus according to claim 1, wherein the frame member includes an intermediate portion extending in the sheet width direction and connecting the first surface and the second surface, and wherein at least one of an upper end of the third surface and an upper end of the fourth surface is positioned above an upper end of the intermediate portion.

7. The image forming apparatus according to claim 1, wherein the frame member includes an intermediate portion extending in the sheet width direction and connecting the first surface and the second surface, wherein the casing includes a supporting portion that is configured to support the sheet discharged from the discharge port, and wherein, when viewed in the sheet width direction, an upper end of the intermediate portion is positioned above an upper surface of the first side plate and an upper surface of the second side plate, and is positioned below the supporting portion.

8. The image forming apparatus according to claim 1, wherein a thickness of the frame member is larger than a thickness of the first side plate and a thickness of the second side plate.

9. The image forming apparatus according to claim 1, further comprising:

an image processing unit that is configured to process image information, wherein the casing further includes a case member to which the image processing unit is attached, wherein part of the case member projects above an upper surface of the second side plate, and wherein the case member is connected to each of the second side plate and the second supporting member.

10. The image forming apparatus according to claim 9, wherein the casing includes:

a first extension member that is arranged above the first side plate and is connected to the first side plate, and a second extension member that is arranged above the second side plate and is connected to the second side plate, and wherein the case member is further connected to the second extension member.

11. The image forming apparatus according to claim 1, wherein the casing includes:

a first extension member that is arranged above the first side plate and is connected to the first side plate, and a second extension member that is arranged above the second side plate and is connected to the second side plate, and wherein an upstream part of the upper unit in the sheet discharge direction is supported by the first extension member and the second extension member, and a downstream part of the upper unit in the sheet discharge direction is supported by the first supporting member and the second supporting member.

12. The image forming apparatus according to claim 1, wherein at least one of the first supporting member and the second supporting member is connected to an upper surface of the upper unit.

13. The image forming apparatus according to claim 1, wherein the upper unit is a sheet processing apparatus that is configured to receive the sheet, on which the image has been formed by the image forming portion, from the casing and perform processing on the sheet.

14. The image forming apparatus according to claim 1, wherein the upper unit is a document reading apparatus that is configured to read image information from a document, and wherein the image forming apparatus is configured to form the image on the sheet based on the image information that the document reading apparatus has read.

* * * * *